(12) United States Patent
Issa et al.

(10) Patent No.: US 7,764,701 B1
(45) Date of Patent: Jul. 27, 2010

(54) METHODS, SYSTEMS, AND PRODUCTS FOR CLASSIFYING PEER SYSTEMS

(75) Inventors: Alfredo C Issa, Apex, NC (US);
Richard J. Walsh, Raleigh, NC (US)

(73) Assignee: QURIO Holdings, Inc., Raleigh, NC (US)

( * ) Notice: Subject to any disclaimer, the term of this patent is extended or adjusted under 35 U.S.C. 154(b) by 537 days.

(21) Appl. No.: 11/359,629

(22) Filed: Feb. 22, 2006

(51) Int. Cl.
*H04L 12/28* (2006.01)
*G06F 15/16* (2006.01)

(52) U.S. Cl. ...................... 370/408; 709/218
(58) Field of Classification Search ................. 370/351, 370/392, 395.1, 395.4, 389, 408, 395; 709/218; 705/26
See application file for complete search history.

(56) References Cited

U.S. PATENT DOCUMENTS

| | | |
|---|---|---|
| 5,220,657 A | 6/1993 | Bly et al. |
| 5,629,980 A | 5/1997 | Stefik et al. |
| 5,717,923 A | 2/1998 | Dedrick |
| 5,749,081 A | 5/1998 | Whiteis |
| 5,754,939 A | 5/1998 | Herz et al. |
| 5,867,799 A | 2/1999 | Lang et al. |
| 5,884,035 A | 3/1999 | Butman et al. |
| 5,983,214 A | 11/1999 | Lang et al. |
| 6,073,138 A | 6/2000 | de l'Etraz et al. |
| 6,088,702 A | 7/2000 | Plantz et al. |
| 6,092,049 A | 7/2000 | Chislenko et al. |
| 6,138,159 A | 10/2000 | Phaal |
| 6,151,624 A | 11/2000 | Teare et al. |
| 6,167,441 A | 12/2000 | Himmel |
| 6,182,808 B1 | 2/2001 | Walton et al. |
| 6,195,696 B1 | 2/2001 | Baber et al. |
| 6,275,819 B1 | 8/2001 | Carter |
| 6,308,175 B1 | 10/2001 | Lang et al. |
| 6,311,194 B1 | 10/2001 | Sheth et al. |
| 6,314,409 B2 | 11/2001 | Schneck et al. |
| 6,327,590 B1 | 12/2001 | Chidlovskii et al. |
| 6,338,086 B1 | 1/2002 | Curtis et al. |

(Continued)

FOREIGN PATENT DOCUMENTS

EP 1177056 A2 1/2001

(Continued)

OTHER PUBLICATIONS

Deborah L. McGuinness et al., editors; "OWL Web Ontology Language—Overview", copyright 2004 World Wide Wide Web Consortium (W3C), published Feb. 10, 2004, http://www.w3.org/TR/2004/REC-owl-features-20040210/, 19 pages.

(Continued)

*Primary Examiner*—Ayaz R Sheikh
*Assistant Examiner*—Hai-Chang Hsiung
(74) *Attorney, Agent, or Firm*—Withrow & Terranova, PLLC

(57) ABSTRACT

Methods, systems, and products are disclosed for classifying peer systems to an ontology. The ontology is stored in memory of a central server. A classification request is received to classify a peer system to the ontology. Peer information is also stored for each peer system associated with a node in the ontology. The peer information is sent to the peer system, thus informing the peer system of other peers associated with the same node.

9 Claims, 16 Drawing Sheets

U.S. PATENT DOCUMENTS

| | | |
|---|---|---|
| 6,356,879 B2 | 3/2002 | Aggarwal et al. |
| 6,374,290 B1 | 4/2002 | Scharber et al. |
| 6,385,619 B1 | 5/2002 | Eichstaedt et al. |
| 6,389,409 B1 | 5/2002 | Horovitz et al. |
| 6,389,541 B1 | 5/2002 | Patterson |
| 6,421,439 B1 | 7/2002 | Liffick |
| 6,438,579 B1 | 8/2002 | Hosken |
| 6,442,693 B1 | 8/2002 | Sandgren et al. |
| 6,457,010 B1 | 9/2002 | Eldering et al. |
| 6,463,433 B1 | 10/2002 | Baclawski |
| 6,480,885 B1 | 11/2002 | Olivier |
| 6,493,703 B1 | 12/2002 | Knight et al. |
| 6,498,795 B1 | 12/2002 | Zhang et al. |
| 6,519,629 B2 | 2/2003 | Harvey et al. |
| 6,525,747 B1 | 2/2003 | Bezos |
| 6,526,411 B1 | 2/2003 | Ward |
| 6,539,375 B2 | 3/2003 | Kawasaki |
| 6,553,367 B2 | 4/2003 | Horovitz et al. |
| 6,560,578 B2 | 5/2003 | Eldering |
| 6,567,122 B1 | 5/2003 | Anderson et al. |
| 6,581,072 B1 | 6/2003 | Mathur et al. |
| 6,594,693 B1 | 7/2003 | Borwankar |
| 6,606,644 B1 | 8/2003 | Ford et al. |
| 6,610,105 B1 | 8/2003 | Martin, Jr. et al. |
| 6,629,100 B2 | 9/2003 | Morris et al. |
| 6,630,944 B1 | 10/2003 | Kakuta et al. |
| 6,631,098 B2 | 10/2003 | Chang et al. |
| 6,651,086 B1 | 11/2003 | Manber et al. |
| 6,654,735 B1 | 11/2003 | Eichstaedt et al. |
| 6,687,732 B1 | 2/2004 | Bector et al. |
| 6,701,362 B1 | 3/2004 | Subramonian et al. |
| 6,725,259 B1 | 4/2004 | Bharat |
| 6,738,764 B2 | 5/2004 | Mao et al. |
| 6,745,178 B1 | 6/2004 | Emens et al. |
| 6,748,420 B1 | 6/2004 | Quatrano et al. |
| 6,757,517 B2 | 6/2004 | Chang |
| 6,772,160 B2 | 8/2004 | Cho et al. |
| 6,785,704 B1 | 8/2004 | McCanne |
| 6,816,906 B1 | 11/2004 | Icken et al. |
| 6,832,245 B1 | 12/2004 | Isaacs et al. |
| 6,839,680 B1 * | 1/2005 | Liu et al. ..................... 705/10 |
| 6,859,807 B1 | 2/2005 | Knight et al. |
| 6,917,944 B1 | 7/2005 | Prasad et al. |
| 6,957,193 B2 | 10/2005 | Stefik et al. |
| 6,959,290 B2 | 10/2005 | Stefik et al. |
| 6,970,444 B2 | 11/2005 | Chwieseni et al. |
| 6,970,840 B1 | 11/2005 | Yu et al. |
| 6,980,993 B2 * | 12/2005 | Horvitz et al. |
| 6,988,096 B2 | 1/2006 | Gupta et al. |
| 6,988,127 B2 | 1/2006 | Matsuda et al. |
| 6,993,564 B2 | 1/2006 | Whitten, II |
| 7,016,307 B2 | 3/2006 | Vasudev et al. |
| 7,024,391 B2 | 4/2006 | Burich |
| 7,039,639 B2 | 5/2006 | Brezin et al. |
| 7,043,644 B2 | 5/2006 | DeBruine |
| 7,047,202 B2 | 5/2006 | Jaipuria et al. |
| 7,047,406 B2 | 5/2006 | Schleicher et al. |
| 7,051,003 B1 | 5/2006 | Kobata et al. |
| 7,054,900 B1 | 5/2006 | Goldston |
| 7,058,606 B2 | 6/2006 | Stefik et al. |
| 7,058,897 B2 | 6/2006 | Matsuda |
| 7,065,579 B2 | 6/2006 | Traversat et al. |
| 7,069,308 B2 | 6/2006 | Abrams |
| 7,072,982 B2 | 7/2006 | Teodosiu et al. |
| 7,103,634 B1 | 9/2006 | Ullmann et al. |
| 7,107,317 B2 | 9/2006 | Demsky et al. |
| 7,117,254 B2 | 10/2006 | Lunt et al. |
| 7,150,030 B1 | 12/2006 | Eldering et al. |
| 7,302,429 B1 | 11/2007 | Wanker |
| 7,359,894 B1 * | 4/2008 | Liebman et al. ................ 707/3 |
| 7,370,015 B2 | 5/2008 | Gvily |
| 2001/0007099 A1 | 7/2001 | Rau et al. |
| 2001/0042043 A1 | 11/2001 | Shear et al. |
| 2002/0032634 A1 | 3/2002 | Abrams et al. |
| 2002/0052885 A1 * | 5/2002 | Levy .......................... 707/200 |
| 2002/0057284 A1 | 5/2002 | Dalby et al. |
| 2002/0077985 A1 | 6/2002 | Kobata et al. |
| 2002/0078206 A1 | 6/2002 | Boies et al. |
| 2002/0091556 A1 | 7/2002 | Fiala et al. |
| 2002/0091667 A1 | 7/2002 | Jaipuria et al. |
| 2002/0091975 A1 | 7/2002 | Redlich et al. |
| 2002/0116466 A1 | 8/2002 | Trevithick et al. |
| 2002/0124053 A1 | 9/2002 | Adams et al. |
| 2002/0138744 A1 | 9/2002 | Schleicher et al. |
| 2002/0152322 A1 | 10/2002 | Hay |
| 2002/0169737 A1 | 11/2002 | Armstrong et al. |
| 2002/0178164 A1 | 11/2002 | Wisniewski |
| 2002/0184357 A1 | 12/2002 | Traversat et al. |
| 2003/0002521 A1 | 1/2003 | Traversat et al. |
| 2003/0009423 A1 | 1/2003 | Wang et al. |
| 2003/0014482 A1 | 1/2003 | Toyota et al. |
| 2003/0018582 A1 | 1/2003 | Yaacovi |
| 2003/0018968 A1 | 1/2003 | Avnet |
| 2003/0028596 A1 | 2/2003 | Toyota et al. |
| 2003/0028639 A1 | 2/2003 | Yamamoto et al. |
| 2003/0050976 A1 | 3/2003 | Block et al. |
| 2003/0050977 A1 | 3/2003 | Puthenkulam et al. |
| 2003/0061282 A1 | 3/2003 | Ebata et al. |
| 2003/0078858 A1 * | 4/2003 | Angelopoulos et al. ....... 705/26 |
| 2003/0079120 A1 | 4/2003 | Hearn et al. |
| 2003/0084162 A1 | 5/2003 | Johnson et al. |
| 2003/0093520 A1 | 5/2003 | Beesley |
| 2003/0101449 A1 | 5/2003 | Bentolila et al. |
| 2003/0105812 A1 | 6/2003 | Flowers, Jr. et al. |
| 2003/0110056 A1 | 6/2003 | Berghofer et al. |
| 2003/0112823 A1 | 6/2003 | Collins et al. |
| 2003/0120662 A1 | 6/2003 | Vishik |
| 2003/0120680 A1 | 6/2003 | Agrawal et al. |
| 2003/0135576 A1 | 7/2003 | Bodin |
| 2003/0163597 A1 | 8/2003 | Hellman et al. |
| 2003/0167324 A1 | 9/2003 | Farnham et al. |
| 2003/0171941 A1 | 9/2003 | Kraenzel et al. |
| 2003/0172034 A1 | 9/2003 | Schneck et al. |
| 2003/0179228 A1 | 9/2003 | Schreiber et al. |
| 2003/0191814 A1 | 10/2003 | Tran |
| 2003/0195851 A1 | 10/2003 | Ong |
| 2003/0195924 A1 | 10/2003 | Franke et al. |
| 2003/0200190 A1 | 10/2003 | Adar et al. |
| 2003/0204605 A1 | 10/2003 | Hudson et al. |
| 2003/0220975 A1 | 11/2003 | Malik |
| 2003/0220980 A1 | 11/2003 | Crane |
| 2004/0015553 A1 | 1/2004 | Griffin et al. |
| 2004/0019846 A1 | 1/2004 | Castellani et al. |
| 2004/0024720 A1 | 2/2004 | Fairweather |
| 2004/0024892 A1 | 2/2004 | Creswell et al. |
| 2004/0032393 A1 | 2/2004 | Brandenberg et al. |
| 2004/0039913 A1 | 2/2004 | Kruse |
| 2004/0044774 A1 | 3/2004 | Mangalik et al. |
| 2004/0054723 A1 | 3/2004 | Dayal et al. |
| 2004/0059705 A1 | 3/2004 | Wittke |
| 2004/0064416 A1 | 4/2004 | Peled et al. |
| 2004/0088325 A1 | 5/2004 | Elder et al. |
| 2004/0103044 A1 | 5/2004 | Vandewater et al. |
| 2004/0122822 A1 | 6/2004 | Thompson et al. |
| 2004/0122855 A1 | 6/2004 | Ruvolo et al. |
| 2004/0137882 A1 | 7/2004 | Forsyth |
| 2004/0148275 A1 | 7/2004 | Achlioptas |
| 2004/0148503 A1 | 7/2004 | Sidman |
| 2004/0148523 A1 | 7/2004 | Lambert |
| 2004/0162871 A1 | 8/2004 | Pabla et al. |
| 2004/0181487 A1 | 9/2004 | Hanson |
| 2004/0193680 A1 | 9/2004 | Gibbs et al. |
| 2004/0205358 A1 | 10/2004 | Erickson |
| 2004/0210535 A1 | 10/2004 | Erickson |

| Publication No. | Date | Inventor |
|---|---|---|
| 2004/0215793 A1 | 10/2004 | Ryan et al. |
| 2004/0220893 A1 | 11/2004 | Spivack et al. |
| 2004/0237045 A1 | 11/2004 | Meltzer |
| 2004/0249768 A1 | 12/2004 | Kontio et al. |
| 2004/0267625 A1 | 12/2004 | Feng et al. |
| 2005/0015357 A1 | 1/2005 | Shahidi |
| 2005/0021096 A1 | 1/2005 | Mower |
| 2005/0031096 A1 | 2/2005 | Postrel |
| 2005/0034107 A1 | 2/2005 | Kendall et al. |
| 2005/0044361 A1 | 2/2005 | Chang et al. |
| 2005/0044411 A1 | 2/2005 | Somin et al. |
| 2005/0076365 A1 | 4/2005 | Popov et al. |
| 2005/0091289 A1 | 4/2005 | Shappell et al. |
| 2005/0091316 A1 | 4/2005 | Ponce et al. |
| 2005/0094313 A1 | 5/2005 | Kim |
| 2005/0097170 A1 | 5/2005 | Zhu et al. |
| 2005/0114783 A1 | 5/2005 | Szeto |
| 2005/0131762 A1 | 6/2005 | Bharat et al. |
| 2005/0138430 A1 | 6/2005 | Landsman |
| 2005/0149621 A1 | 7/2005 | Kirkland et al. |
| 2005/0154701 A1 | 7/2005 | Parunak et al. |
| 2005/0159970 A1 | 7/2005 | Buyukkokten et al. |
| 2005/0159998 A1 | 7/2005 | Buyukkokten et al. |
| 2005/0163135 A1 | 7/2005 | Hopkins |
| 2005/0165726 A1 | 7/2005 | Kawell, Jr. et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0172001 A1 | 8/2005 | Zaner et al. |
| 2005/0172116 A1 | 8/2005 | Burch et al. |
| 2005/0177385 A1 | 8/2005 | Hull et al. |
| 2005/0177614 A1 | 8/2005 | Bourne |
| 2005/0197846 A1 | 9/2005 | Pezaris et al. |
| 2005/0198031 A1 | 9/2005 | Pezaris et al. |
| 2005/0198131 A1 | 9/2005 | Appelman et al. |
| 2005/0198172 A1 | 9/2005 | Appelman et al. |
| 2005/0198305 A1 | 9/2005 | Pezaris et al. |
| 2005/0201290 A1 | 9/2005 | Vasudev et al. |
| 2005/0203801 A1 | 9/2005 | Morgenstern et al. |
| 2005/0204038 A1 | 9/2005 | Medvinsky et al. |
| 2005/0209999 A1 | 9/2005 | Jou |
| 2005/0210104 A1 | 9/2005 | Torvinen |
| 2005/0210387 A1 | 9/2005 | Alagappan et al. |
| 2005/0210409 A1 | 9/2005 | Jou |
| 2005/0215660 A1 | 9/2005 | Tomikawa et al. |
| 2005/0216300 A1 | 9/2005 | Appelman et al. |
| 2005/0216550 A1 | 9/2005 | Paseman et al. |
| 2005/0226511 A1 | 10/2005 | Short |
| 2005/0229243 A1 | 10/2005 | Svendsen et al. |
| 2005/0232423 A1 | 10/2005 | Horvitz et al. |
| 2005/0234864 A1 | 10/2005 | Shapiro |
| 2005/0235062 A1 | 10/2005 | Lunt et al. |
| 2005/0240773 A1 | 10/2005 | Hilbert et al. |
| 2005/0243736 A1 | 11/2005 | Faloutsos et al. |
| 2005/0246420 A1 | 11/2005 | Little, II |
| 2005/0251553 A1 | 11/2005 | Gottfried |
| 2005/0256756 A1 | 11/2005 | Lam et al. |
| 2005/0256866 A1 | 11/2005 | Lu et al. |
| 2005/0256909 A1 | 11/2005 | Aboulhosn et al. |
| 2005/0262162 A1 | 11/2005 | Levy |
| 2005/0262199 A1 | 11/2005 | Chen et al. |
| 2005/0262530 A1 | 11/2005 | Ruetschi et al. |
| 2005/0266835 A1 | 12/2005 | Agrawal et al. |
| 2005/0267766 A1 | 12/2005 | Galbreath et al. |
| 2005/0267940 A1 | 12/2005 | Galbreath et al. |
| 2005/0268329 A1 | 12/2005 | Lee et al. |
| 2005/0283497 A1 | 12/2005 | Nurminen et al. |
| 2005/0289648 A1 | 12/2005 | Grobman et al. |
| 2006/0004789 A1 | 1/2006 | Lunt et al. |
| 2006/0004892 A1 | 1/2006 | Lunt et al. |
| 2006/0010225 A1 | 1/2006 | Issa |
| 2006/0015588 A1 | 1/2006 | Achlioptas et al. |
| 2006/0015868 A1 | 1/2006 | Rechterman et al. |
| 2006/0020960 A1 | 1/2006 | Relan et al. |
| 2006/0021009 A1 | 1/2006 | Lunt |
| 2006/0026235 A1 | 2/2006 | Schwarz et al. |
| 2006/0031489 A1 | 2/2006 | Marcjan |
| 2006/0031770 A1 | 2/2006 | McMenamin |
| 2006/0035766 A1 | 2/2006 | Towley, III et al. |
| 2006/0036641 A1 | 2/2006 | Brydon et al. |
| 2006/0036766 A1 | 2/2006 | Baupin et al. |
| 2006/0042483 A1 | 3/2006 | Work et al. |
| 2006/0047635 A1 | 3/2006 | Kraenzel et al. |
| 2006/0047839 A1 | 3/2006 | Tate et al. |
| 2006/0048059 A1 | 3/2006 | Etkin |
| 2006/0053380 A1 | 3/2006 | Spataro et al. |
| 2006/0063552 A1 | 3/2006 | Tillet et al. |
| 2006/0064411 A1 | 3/2006 | Gross et al. |
| 2006/0064431 A1 | 3/2006 | Kishore et al. |
| 2006/0085248 A1 | 4/2006 | Arnett et al. |
| 2006/0085818 A1 | 4/2006 | Bodlaender et al. |
| 2006/0089913 A1 | 4/2006 | Jaipuria et al. |
| 2006/0090137 A1 | 4/2006 | Cheng et al. |
| 2006/0095514 A1 | 5/2006 | Wang et al. |
| 2006/0095792 A1 | 5/2006 | Hurtado et al. |
| 2006/0095976 A1 | 5/2006 | Torres et al. |
| 2006/0107286 A1 | 5/2006 | Connor et al. |
| 2006/0112111 A1 | 5/2006 | Tseng et al. |
| 2006/0117090 A1 | 6/2006 | Schellingerhout et al. |
| 2006/0117378 A1 | 6/2006 | Tam et al. |
| 2006/0121987 A1 | 6/2006 | Bortnik et al. |
| 2006/0121988 A1 | 6/2006 | Reville et al. |
| 2006/0123127 A1 | 6/2006 | Littlefield |
| 2006/0136419 A1 | 6/2006 | Brydon et al. |
| 2006/0136551 A1 | 6/2006 | Amidon et al. |
| 2006/0143067 A1 | 6/2006 | Calabria |
| 2006/0143068 A1 | 6/2006 | Calabria |
| 2006/0143183 A1 | 6/2006 | Goldberg et al. |
| 2006/0143236 A1 | 6/2006 | Wu |
| 2006/0146765 A1 | 7/2006 | Van De Sluis et al. |
| 2006/0155813 A1 | 7/2006 | Dietz et al. |
| 2006/0161553 A1 | 7/2006 | Woo |
| 2006/0167804 A1 | 7/2006 | Aydar et al. |
| 2006/0167855 A1 | 7/2006 | Ishikawa et al. |
| 2006/0173838 A1 | 8/2006 | Garg et al. |
| 2006/0173957 A1 | 8/2006 | Robinson et al. |
| 2006/0173963 A1 | 8/2006 | Roseway et al. |
| 2006/0173985 A1* | 8/2006 | Moore ........................ 709/223 |
| 2006/0184464 A1 | 8/2006 | Tseng et al. |
| 2006/0184997 A1 | 8/2006 | La Rotonda et al. |
| 2006/0190524 A1 | 8/2006 | Bethke et al. |
| 2006/0190536 A1 | 8/2006 | Strong et al. |
| 2006/0195441 A1 | 8/2006 | Julia et al. |
| 2006/0195462 A1 | 8/2006 | Rogers |
| 2006/0200434 A1 | 9/2006 | Flinn et al. |
| 2006/0200435 A1 | 9/2006 | Flinn et al. |
| 2006/0209727 A1 | 9/2006 | Jennings, III et al. |
| 2006/0218153 A1 | 9/2006 | Voon et al. |
| 2006/0218225 A1 | 9/2006 | Hee Voon et al. |
| 2006/0218577 A1 | 9/2006 | Goodman et al. |
| 2006/0242581 A1 | 10/2006 | Manion et al. |
| 2006/0248573 A1 | 11/2006 | Pannu et al. |
| 2006/0259957 A1 | 11/2006 | Tam et al. |
| 2006/0259982 A1 | 11/2006 | Upendran |
| 2006/0267940 A1 | 11/2006 | Groom et al. |
| 2007/0106627 A1 | 5/2007 | Srivastava et al. |
| 2007/0173325 A1 | 7/2007 | Shaw et al. |
| 2008/0098010 A1* | 4/2008 | Ben Asher et al. |

FOREIGN PATENT DOCUMENTS

| | | |
|---|---|---|
| EP | 1 338 966 A3 | 8/2003 |
| EP | 1675060 A1 | 10/2005 |
| WO | WO 2005/111760 A1 | 11/2005 |
| WO | WO2006036165 A2 | 4/2006 |

| | | |
|---|---|---|
| WO | WO2006041425 A2 | 4/2006 |

OTHER PUBLICATIONS

Pretschner, Alexander et al., "Ontology Based Personalized Search," Proceedings of the 11th IEEE International Conference on Tools with Artificial Intelligence, p. 391, Nov. 8-10, 1999.

Srinivasan, T. et al., "OPSHNN: Ontology Based Personalized Searching Using Hierarchical Neural Networks Evidence Combination," The Sixth IEEE International Conference on Computer and Information Technology 2006, pp. 44-44, Sep. 2006.

Architecture of Windows Media Rights Manager, www.microsoft.com/windows/windowsmedia/howto/articles/drmarchitecture.aspx.

FOAF Vocabulary Specification, http://xmlns.com/foaf/0.1/.

Pidgin, http://pidgin.im/pidgin/home/.

Warren Sack, "Discourse Diagrams: Interface Design for Very Large-Scale Conversations," System Sciences, Proceedings of the 33rd Annual Hawaii International Conference, 2000.

Marc A. Smith and Andrew T. Flore, "Visualization Components for Persistent Conversations," Sep. 2000.

The Case for a Hybrid P2P Search Infrastructre, http://www.cs.berkeley.edu/~boonloo/research/pier/casehybrid_iptps.ppt.

Dijkstra's algorithm, http://en.wikipedia.org/wiki/Dijkstra's_algorithm.

Welcome to Facebook!, http://www.facebook.com/.

The Friend of a Fried (FOAF) Project, http://www.foaf-project.com.

Friendster—Home, http://www.friendster.com.

News—Gaim 1.5.0, http://www.gaim.sourceforge.net.

Huminity—Social Networking, http://www.huminity.com/english/software.html.

ICQ, http://www.icq/com/.

MySpace, http://www.myspace.com.

Beverly Yang et al., "Designing a Super-Peer Network," 19th International Conference on Data Engineering (ICDE'03), 2003.

M.E.J. Newman, "The Mathematics of networks," (chapter), 12 pages, 2008, in The New Palgrave Encyclopedia of Economics, 2nd edition, L. E. Blume and S. N. Durlauf (eds.), Palgrave Macmillan, Basingstoke, http://www-personal.umich.edu/~mejn/papers/palgrave.pdf.

No Author, "Centrality - Wikipedia," (website), 3 pages, obtained Sep. 19, 2007, http://en.wikipedia.org/wiki/Eigenvector_Centrality.

No Author, "Centrality - Wikipedia," (website), 3 pages, obtained Sep. 19, 2007, http://en.wikipedia.org/wiki/Centrality.

\* cited by examiner

METHODS, SYSTEMS, AND PRODUCTS FOR CLASSIFYING PEER SYSTEMS

BACKGROUND

This application particularly relates to peer-to-peer environments and, more particularly, classifying peer systems to an ontology.

Finding relevant and useful information in a peer-to-peer network may be difficult. A peer-to-peer network may have hundreds, or even thousands, of interconnected peer systems. Peer systems, then, may use a "flood" query to find desired content. A flood query, however, may generate too much traffic overhead in the peer network. Moreover, the flood query may never reach the peer hosting the desired content. Other techniques, such as semantic overlays and content addressable networks, also require much management overhead. What is needed, then, are methods, systems, and products that classify the information stored on peers in a peer-to-peer environment, thus allowing users to efficiently obtain information.

SUMMARY

The problems noted above, along with other problems, may be reduced or eliminated by embodiments of the present invention using methods, systems, and products that classify the content available from peer systems. According to one aspect of the present invention, ontological concepts are used to classify peer systems around ontological nodes. Each peer system interacts with a central server, website, or stable peer and is classified against an ontology. The information available from each peer system is associated with one or multiple ontological nodes. Other peer systems may then submit queries and learn what peer systems store information matching ontological subject matter. The present invention not only helps locate the peer systems that store relevant information, but the present invention may even help determine exactly what information is available from each peer system. The present invention, then, organizes peer-to-peer systems to efficiently locate relevant and useful information.

According to another aspect, methods, systems, and products classify peer systems to an ontology. The ontology is stored in memory, and the ontology includes peer information for each peer system associated with a node in the ontology. A classification request is received to classify a peer system to the ontology. The peer information is sent to the peer system, wherein the peer information informs the peer system of other peers associated with the node.

According to another aspect of the present invention, a system is disclosed for classifying peer systems. A classification application is stored in memory, and a processor communicates with the memory. The processor stores an ontology in the memory, and the ontology comprises peer information for each peer system associated with a node in the ontology. The processor receives a classification request to classify a peer system to the ontology. The processor sends the peer information to the peer system, wherein the peer information informs the peer system of other peers associated with the node.

In yet another aspect, a computer program product classifies peer systems. The computer program product comprises a computer-readable medium that stores processor-executable instructions. These instructions cause the processor to store an ontology in memory, and the ontology comprises peer information for each peer system associated with a node in the ontology. The processor receives a classification request to classify a peer system to the ontology. The processor sends the peer information to the peer system, wherein the peer information informs the peer system of other peers associated with the node.

Other aspects, including systems, methods, and/or computer program products according to the present invention will be or become apparent to one with ordinary skill in the art upon review of the following drawings and detailed description. Such additional aspects, including systems, methods, and/or computer program products, are included within the scope of the present invention.

BRIEF DESCRIPTION OF THE SEVERAL VIEWS OF THE DRAWINGS

The accompanying drawing figures incorporated in and forming a part of this specification illustrate several aspects, features, principles and advantages of the present invention, and together with the Detailed Description serve to better explain the aspects, features, principles, and advantages of the invention.

DETAILED DESCRIPTION

The present invention now will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will convey the invention to those skilled in the art.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
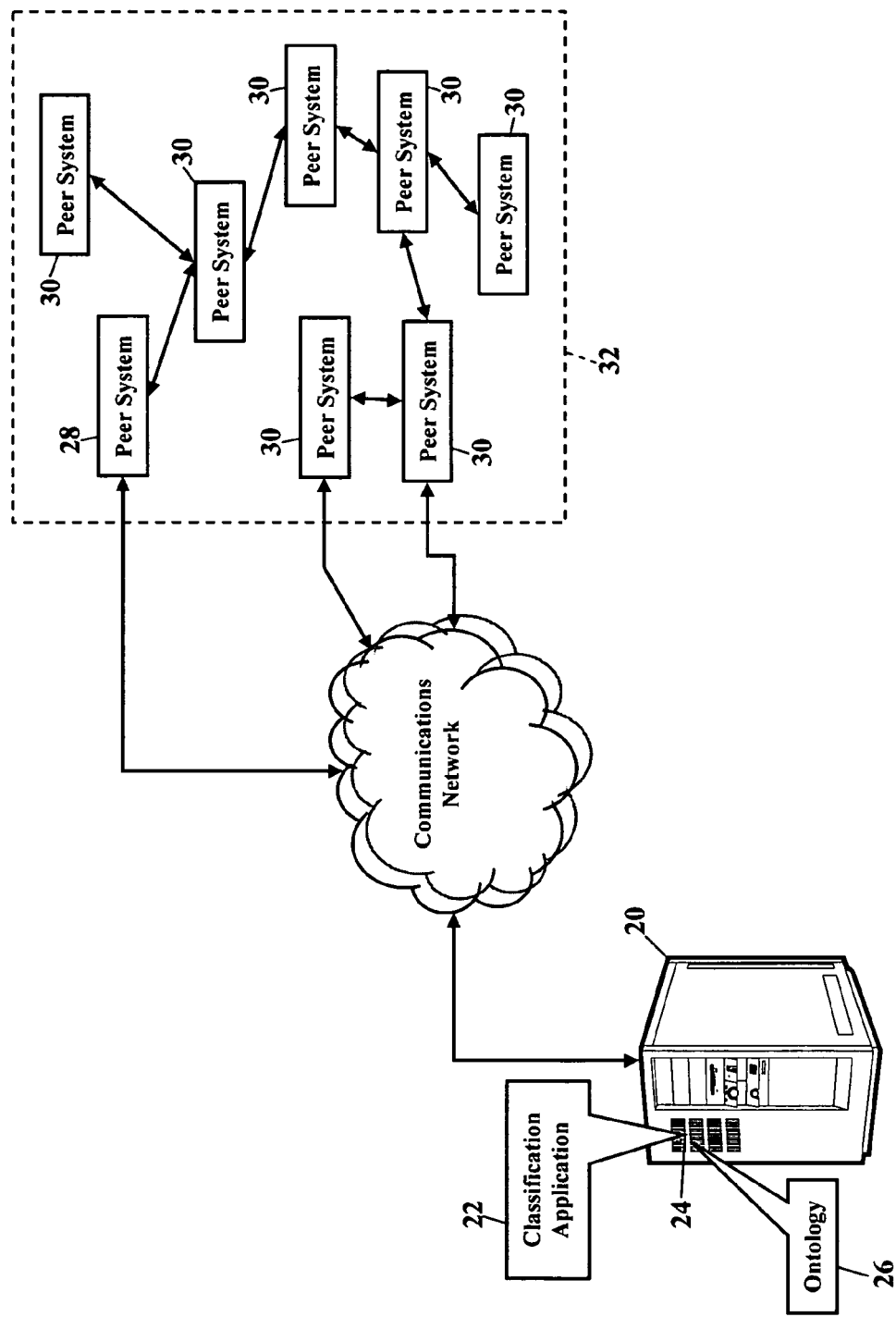
FIG. 1 is a simplified schematic illustrating a system for classifying peer systems.

FIG. 1 is a simplified schematic illustrating a network environment in which exemplary embodiments of the present invention may be implemented. A central server 20 stores a classification application 22 in memory 24. The central server 20 may also store an ontology 26 in the memory 24. As the following paragraphs will explain, the present invention allows a peer system 28 to discover what information is available from other peer systems 30 operating in a peer-to-peer network environment 32. Because there may be hundreds, or even thousands, of peer systems 30 having a peer-to-peer networking arrangement, users of the peer systems 28 and 30 often have difficulty finding useful and/or relevant information. The classification application 22, however, organizes the peer systems using ontological concepts. Each peer system 28 and 30 interacts with the central server 20 and gets classified by the central server 20 based, at least in part, on the ontology 26. The central server 20, for example, may host a website in which each peer system 28 and 30 visits for classification. Each peer system 28 and 30 is associated to one or multiple nodes of an ontological tree, based on what information is available from the peer system 28 and 30. The classification application 22 then maintains a list of what peer systems are associated with a particular node of the ontology 26. When any peer system 30 then queries the central server 20 for ontological terms, the classification application 22 returns a listing of those peer systems associated with the matching ontological nodes. The classification application 22 thus provides an efficient and quick method of finding useful and/or relevant information in the peer-to-peer network environment.

Figure 2:
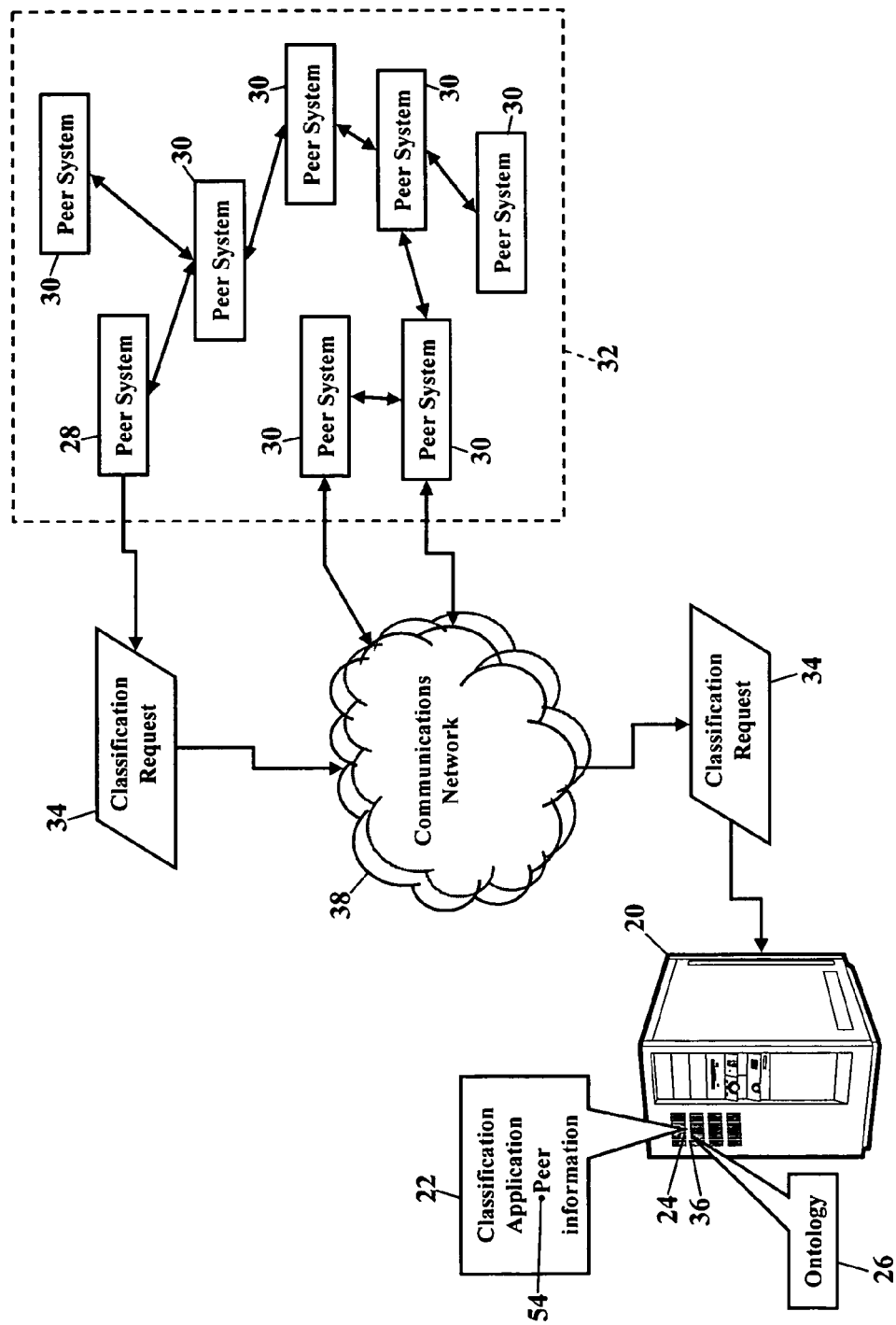
FIGS. 2 and 3 are more detailed schematics illustrating a system for classifying peer systems.
Figure 3:
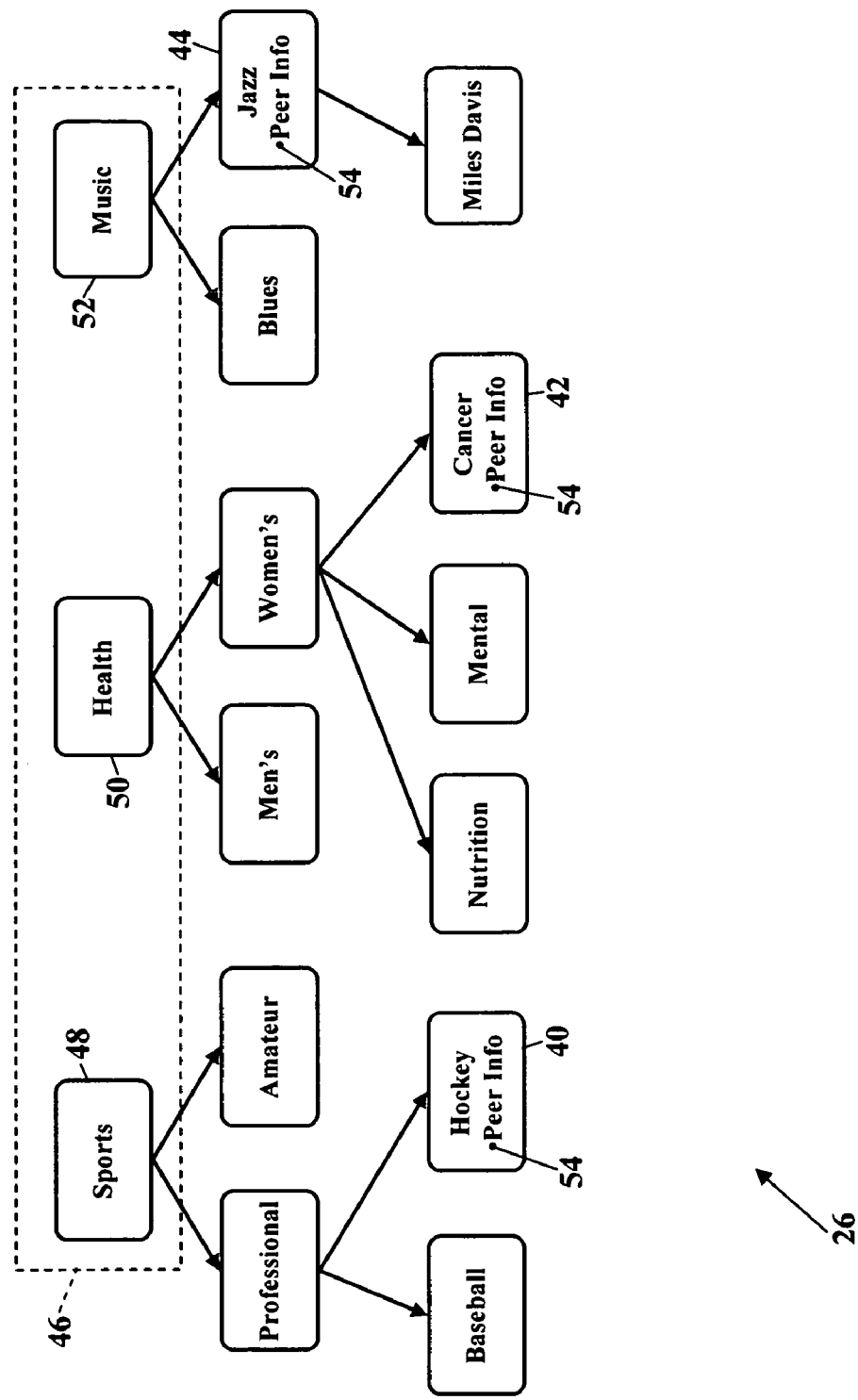

FIGS. 2 and 3 are more detailed schematics illustrating a system for classifying peer systems. FIG. 2 illustrates a classification request 34, while FIG. 3 illustrates a simple form of the ontology 26. The classification application 22 is stored within the memory 24 of the central server 20. A processor 36 communicates with the memory 24 and executes code or instructions within the classification application 22. The ontology 26 is also stored within the memory 24 of the central server 20. The central server 20 receives the classification request 34 via a communications network 38. The classification request 34 communicates from the peer system 28. When the peer system 28 sends the classification request 34, the peer system 28 seeks to be classified against the ontology 26. That is, when the peer system 28 is classified to the ontology 26, the information available from that peer system 28 is associated to one or multiple nodes within the ontology 26. The peer system 28 may also be classified to one or multiple hierarchical tiers or levels within the ontology 26. Whatever information is available from the peer system 28 is classified to as many ontological nodes as necessary. Each node and/or level within the ontology 26 may have an associated membership qualification. If any information stored on the peer system satisfies the membership qualification, then the peer system 28 may be classified as a member of that node/level.

FIG. 3 illustrates a portion of the ontology 26. As FIG. 3 illustrates, if any peer system contains information about the sport of hockey, then the peer system may be classified to a "Hockey" node 40. Similarly, if any peer system also contains cancer information and jazz information, then the peer system may also be classified to a "Cancer" node 42 and to a "Jazz" node 44. The same peer system could also be classified to another hierarchical tier 46 containing the more generic "Sports" node 48, "Health" node 50, and "Music" node 52. Whatever the information available from the peer system, that information may be classified be to as many ontological levels and/or nodes as necessary.

FIGS. 2 and 3 also illustrate nodal peer information 54. As the classification application 22 classifies peer systems to ontological nodes, the classification application may also maintain a membership listing for any node. As the peer system is classified and associated to a node and/or to a tier in the ontology 26, the classification application 22 may maintain a list of peer systems that similarly associated with each node and/or level. The peer information 54 thus describes or identifies some or all of the peer systems that are associated with any particular node or tier. The classification application 22, for example, may contain a listing of all the peer systems who are members of the "Hockey" node 40. Similarly, the classification application 22 may also store membership information for the Cancer" node 42 and the "Jazz" node 44. Because there may be hundreds or thousands of peer systems having a peer-to-peer networking arrangement, the peer information 54 quickly identifies which peer systems are classified to a particular node (e.g., a similar subject matter) within the ontology 26. The classification application 22 thus uses the peer information 54 to identify a cluster of peer systems storing similar ontological information.

Figure 4:
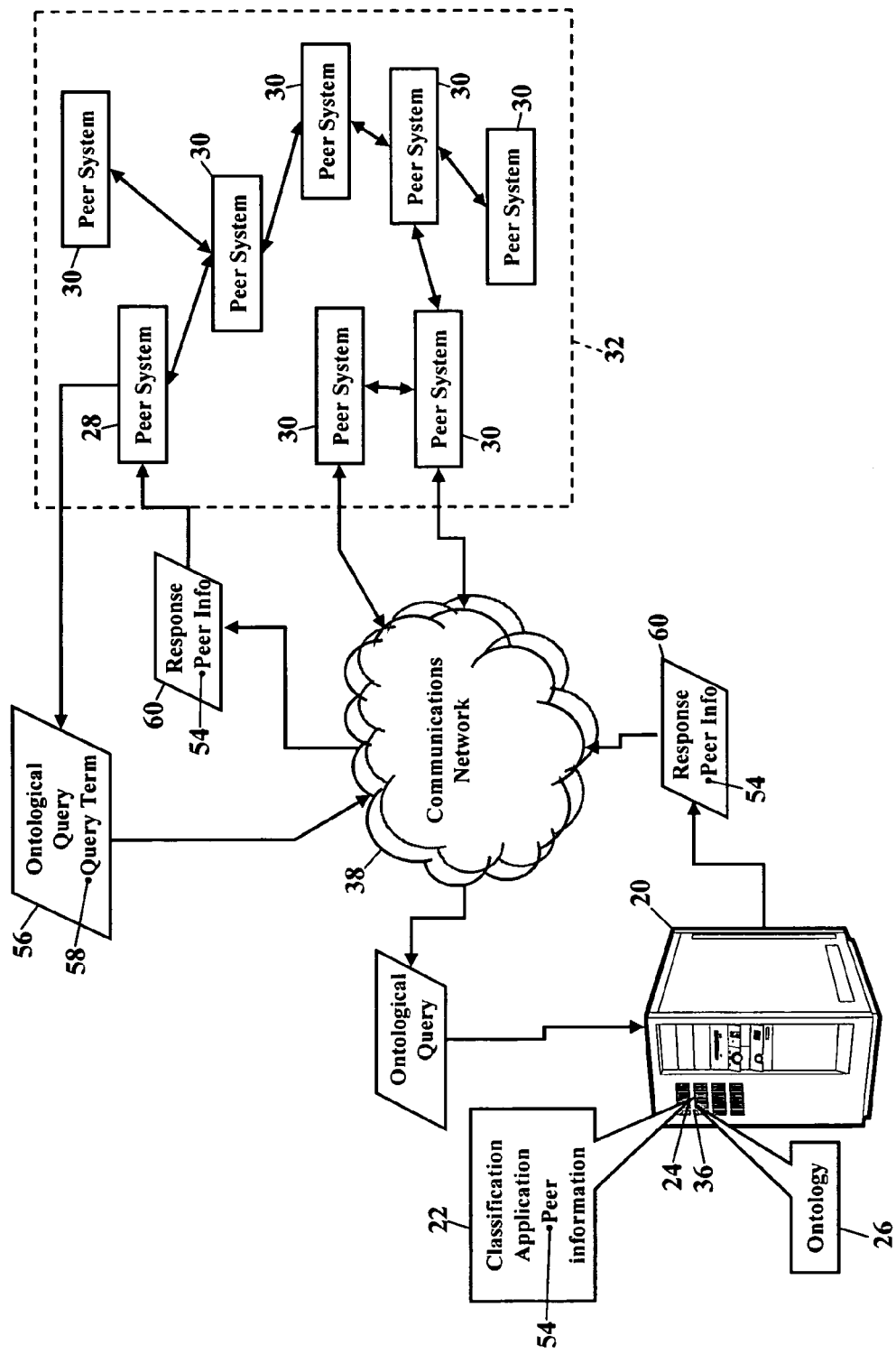
FIG. 4 is a schematic illustrating a query to a classification system.

FIG. 4 is a schematic illustrating a query 56 to the central server 20, according to more exemplary embodiments. Here the peer system 28 queries the classification application 22 to learn what other peer systems store information regarding a particular ontological subject. Suppose a user of the peer system 28 wishes to learn what other peer systems store information regarding jazz music. The peer system 28 issues the ontological query 56, and the query 56 includes a query term 58. Here, then, the query term 58 might include the broad term "Jazz music." The query 56 communicates to the central server 20 via the communications network 38. When the central server 20 receives the query 56, the classification application 22 in turn queries the ontology 26 for the query term 58 (e.g., "Jazz music"). The classification application 22 queries to determine if any nodes and/or tiers within the ontology 26 contain data matching the query term 58. The classification application 22 and/or the ontology 26 then retrieves at least the peer information 54 that identifies those peer systems associated with any node or tier matching the query term 58. Here, then, in this example the peer information 54 describes some or all of the peer systems that are associated with the "Jazz" node (shown as reference numeral 44 in FIG. 3). The classification application 22 then instructs the processor 36 to send a response 60 to the peer system 28. The response 60 communicates via the communications network 38, and the response 60 comprises the peer information 54. When the peer system 28 receives the response 60, the peer system 28 may process the peer information 54 and, thus, know the identity of other peer systems storing information regarding jazz music.

The ontology 26 may be provided or created. A third party, for example, may provide the ontology 26. The ontology 26 may have any form and complexity to help organize peer systems operating in a peer-to-peer networking environment. A large website, such as AMAZON® or EBAY®, may offer their own ontology to help potential users "swarm" around ontological subject matter. The third party may charge a fee for each classification to the ontology 26, or the third party may profit from products or services associated with the ontological subject matter (as will be later explained). The ontology 26, however, may also be created from common content discovered in the peer-to-peer networking environment 32 or from content found on the Internet. How the ontology 26 is obtained, however, is not important to the present invention. Moreover, basic ontological concepts are known and need not be further explained. If, however, the reader desires more information, the reader is invited to consult the following sources, all of which are incorporated herein by reference in their entirety: W3C Recommendation, OWL Web Ontology Language—Overview, available from W3C, 32 Vassar Street, Room 32-G515, Cambridge, Mass. 02139 USA; U.S. Pat. No. 6,151,624 to Teare et al. (Nov. 21, 2000); U.S. Pat. No. 6,311,194 to Sheth et al. (Oct. 3, 2001); U.S. Pat. No. 6,389,409 to Horovitz et al. (May 14, 2002); U.S. Pat. No. 6,463,433 to Baclawski (Oct. 8, 2002); U.S. Pat. No. 6,498,795 to Zhang et al. (Dec. 24, 2002); U.S. Pat. No. 6,553,367 to Horovitz et al. (Apr. 22, 2003); U.S. Pat. No. 6,629,100 to Morris et al. (Sep. 30, 2003); U.S. Pat. No. 6,917,944 to Prasad et al. (Jul. 12, 2005); U.S. Pat. No. 6,970,840 to Yu et al. (Nov. 29, 2005); U.S. Patent to Cho et al. U.S. Pat. No. 6,772,160 (Aug. 3, 2004); Published U.S. Patent Application 2003/0120662 to Vishik (Jun. 26, 2003); Published U.S. Patent Application 2003/0163597 to Hellman et al. (Aug. 28, 2003); Published U.S. Patent Application 2003/0179228 to Schreiber et al. (Sep. 25, 2003); Published U.S. Patent Application 2003/0204605 to Hudson et al. (Oct. 30, 2003); Published U.S. Patent Application 2004/0024720 to Fairweather (Feb. 5, 2004); Published U.S. Patent Application 2004/0220893 to Spivack et al. (Nov. 4, 2004); Published U.S. Patent Application 2005/0034107 to Kendall et al. (Feb. 10, 2005); Published U.S. Patent Application 2005/0154701 to Parunak et al. (Jul. 14, 2005); and the co-pending and commonly assigned U.S. patent application Ser. No. 11/359,632, filed Feb. 22, 2006, and entitled "Methods, Systems, and Products for Characterizing Target Systems".

Figure 5:
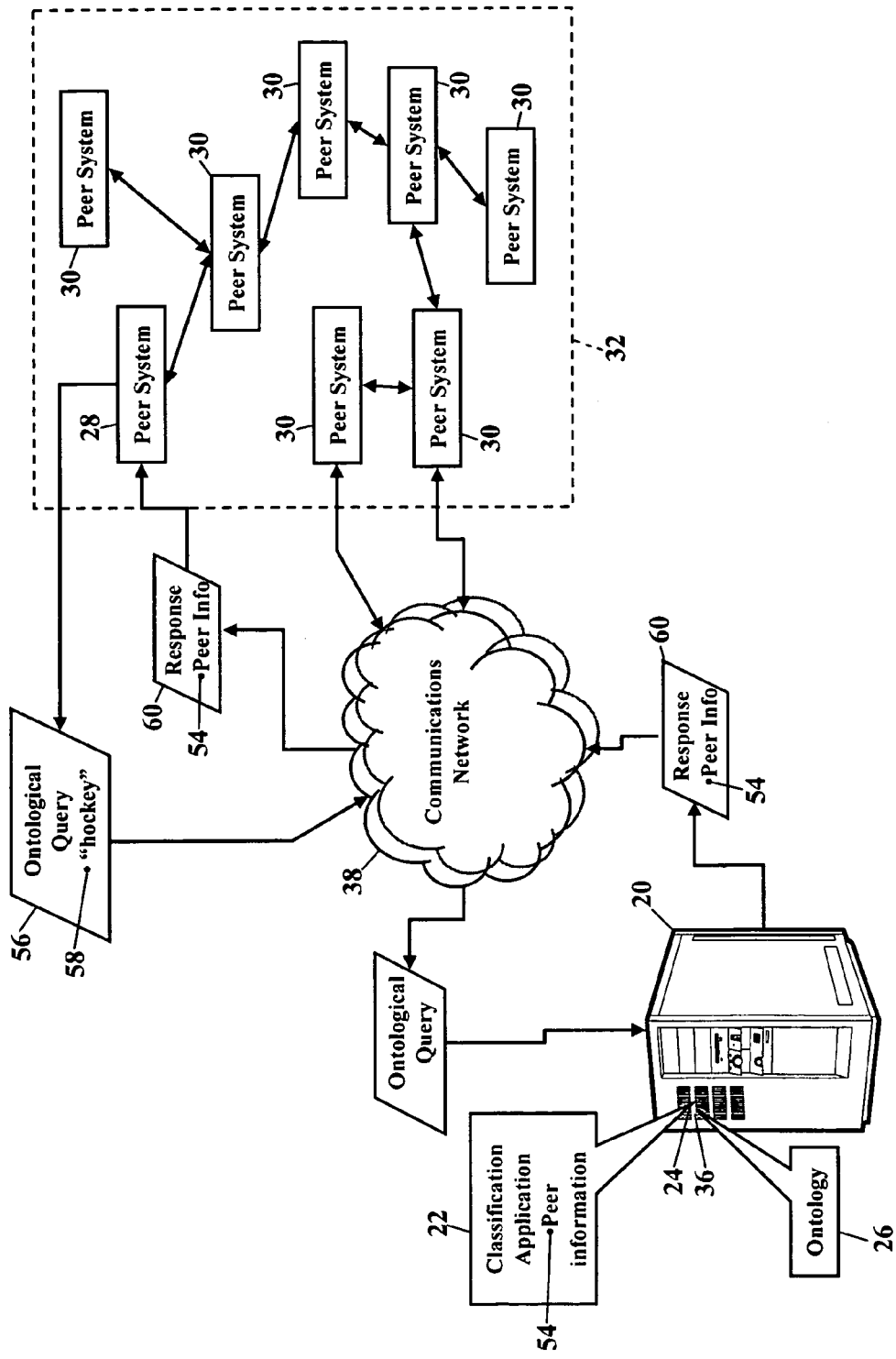
FIGS. 5-13 are schematics illustrating peer information.
Figure 6:
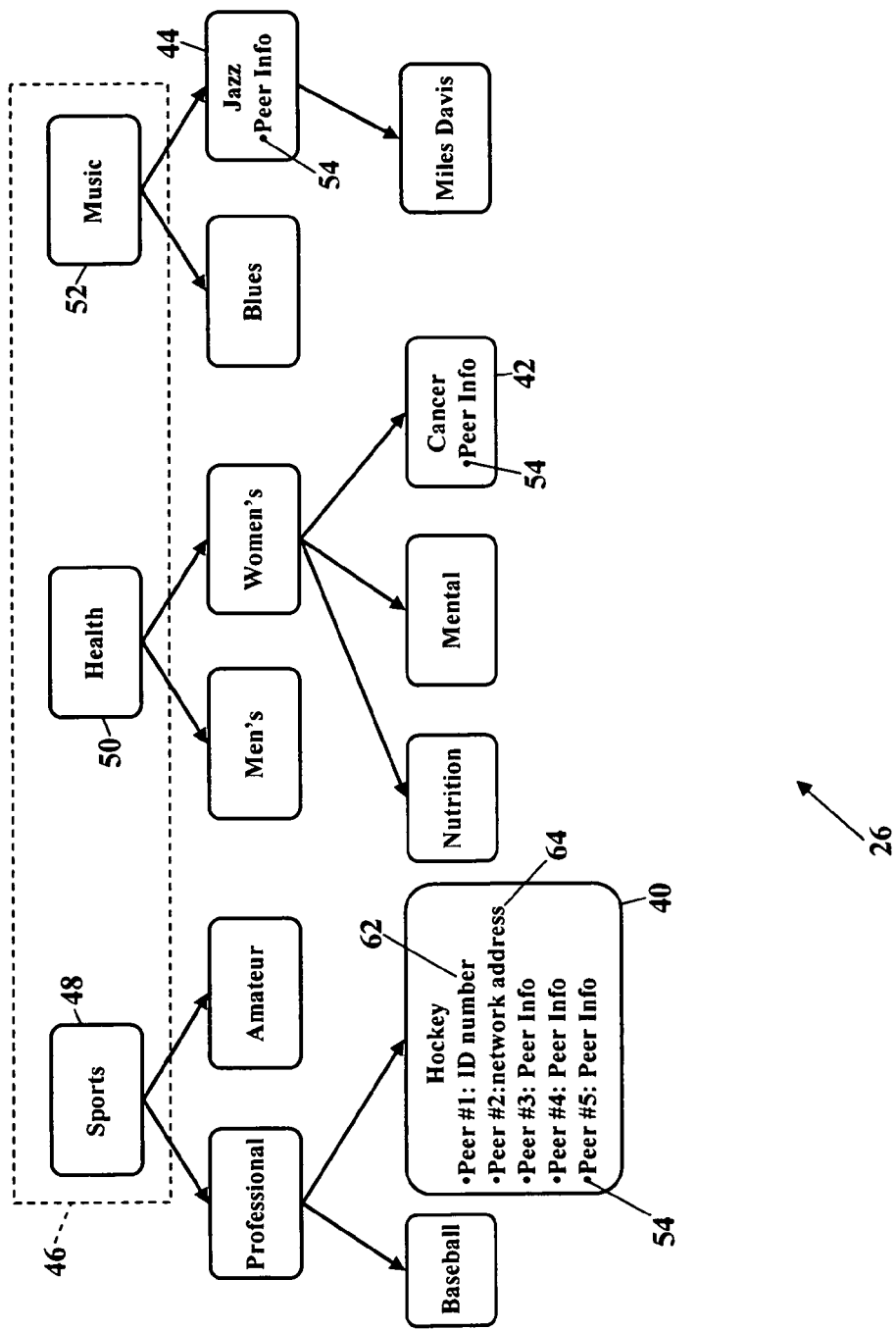

FIGS. 5 and 6 are schematics further illustrating the peer information 54, according to more exemplary embodiments of the present invention. As the previous paragraphs explained, the peer information 54 identifies those peer systems associated with any node or tier within the ontology 26. As FIG. 5 illustrates, suppose the peer system 28 queries the classification application 22 to learn what other peer systems store information regarding the sport of hockey. The peer system 28 issues the query 56 including the query term 58 of "hockey." When the central server 20 receives the query 56, the classification application 22 in turn queries the ontology 26 for the query term "hockey." The classification application 22 then instructs the processor 36 to send the response 60 to the peer system 28, and the response 60 includes the peer information 54. The peer information 54 identifies those peer systems associated with any node or tier matching the query for "hockey."

FIG. 6 illustrates the ontology 26. Suppose five (5) peer systems are classified to the "Hockey" node 40. Each peer system that is classified to the "Hockey" node 40 is identified by its corresponding peer information 54. Here each peer system's associated peer information 54 may include an identification number 62. The identification number 62 may identify each peer system. The identification number 62, for example, may be a network address 64 associated with, or assigned to, the peer system. If the identification number 62 is an Internet protocol address, that Internet protocol address would uniquely identify how a classified peer system may be reached. The identification number 62 may additionally or alternatively be an email address, pager address, telephone number, or other communications address, thus allowing a user of the peer system to be reached. The identification number 62 may additionally or alternatively include a serial number, model number, or processor number. Whatever the identification number 62, the identification number 62 allows users to establish a peer-to-peer relationship to obtain the classified peer system's hockey information.

The identification number 62 may have other meanings and values. The identification number 62 may be a number that represents a strength of the classification. Each peer system for example, may be scored or ranked to the ontological node, such that the peer with the highest score or ranking would have the strongest affinity to the "Hockey" node 40. Conversely, those peers with lower scores or rankings may have less relevance to the "Hockey" node 40. The identification number 62 may then help quickly determine what peer systems store the most relevant or useful information. The identification number 62 may also include a code or personal identification number that is required to access a particular peer system.

Figure 7:
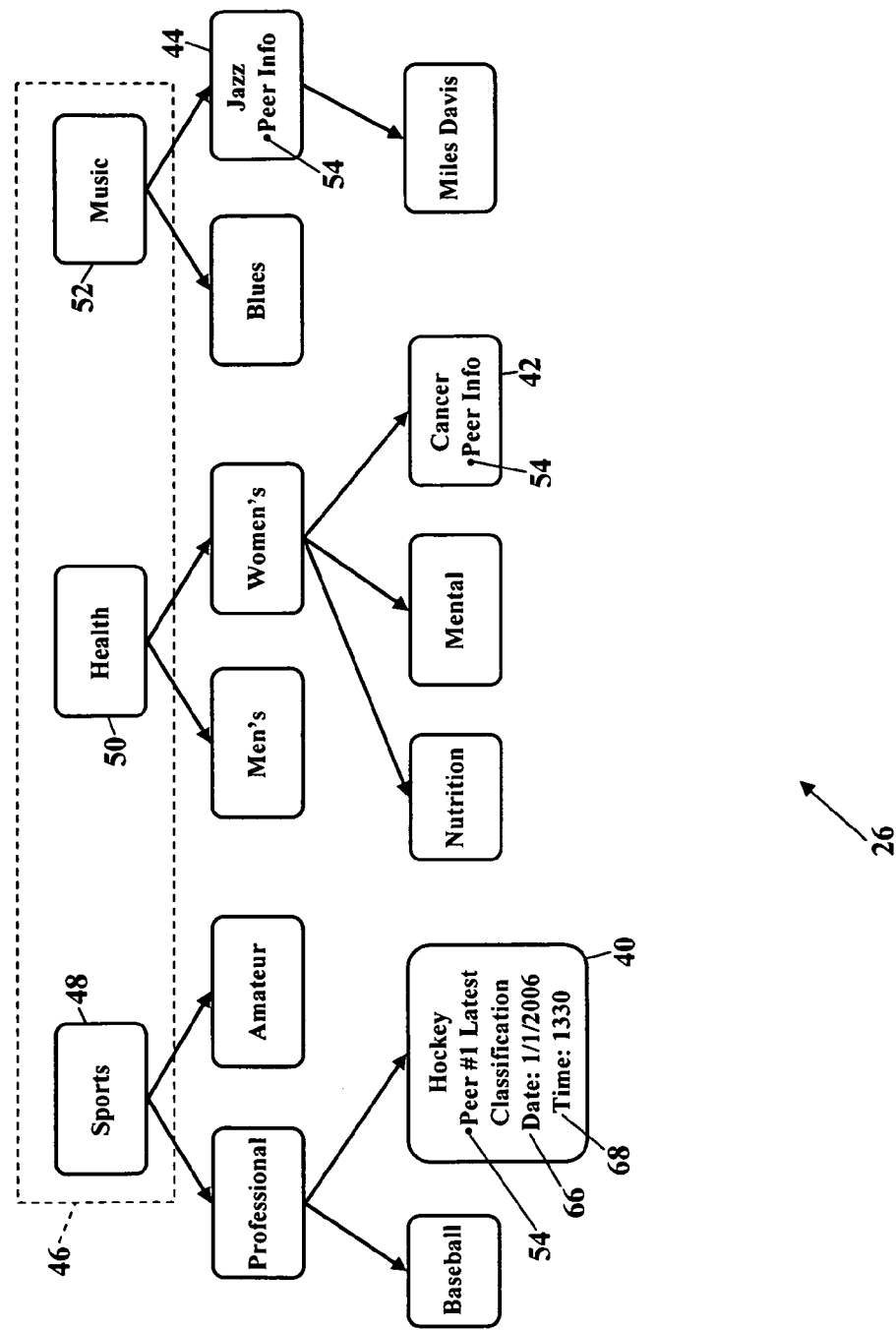

FIG. 7 is another schematic that further illustrates the peer information 54. Here the peer information 54 may comprise a time to live. This data field may determine a date or time threshold before the central server (shown as reference numeral 20 in FIGS. 1-2 & 4-5) should receive a classification refresh message from a peer system. The peer information 54 may additionally or alternatively comprise at least one of a date 66 and a time 68 of a most recent classification for each peer system. As the previous paragraphs explained, when a peer system is classified, the information stored in that peer system is associated to one or more ontological nodes. The peer information 54, then, may include the date 66 and/or the time 68 of the most recent classification. This peer information 54 would thus indicate the validity or freshness of the information available from a peer system. A peer system that was classified within the past hour may have fresher information that another peer system that was classified last week. Because there may be hundreds or thousands of peer systems associated with a single ontological node, the date 66 and/or the time 68 of the most recent classification may help quickly determine what peer systems store the freshest information.

Figure 8:
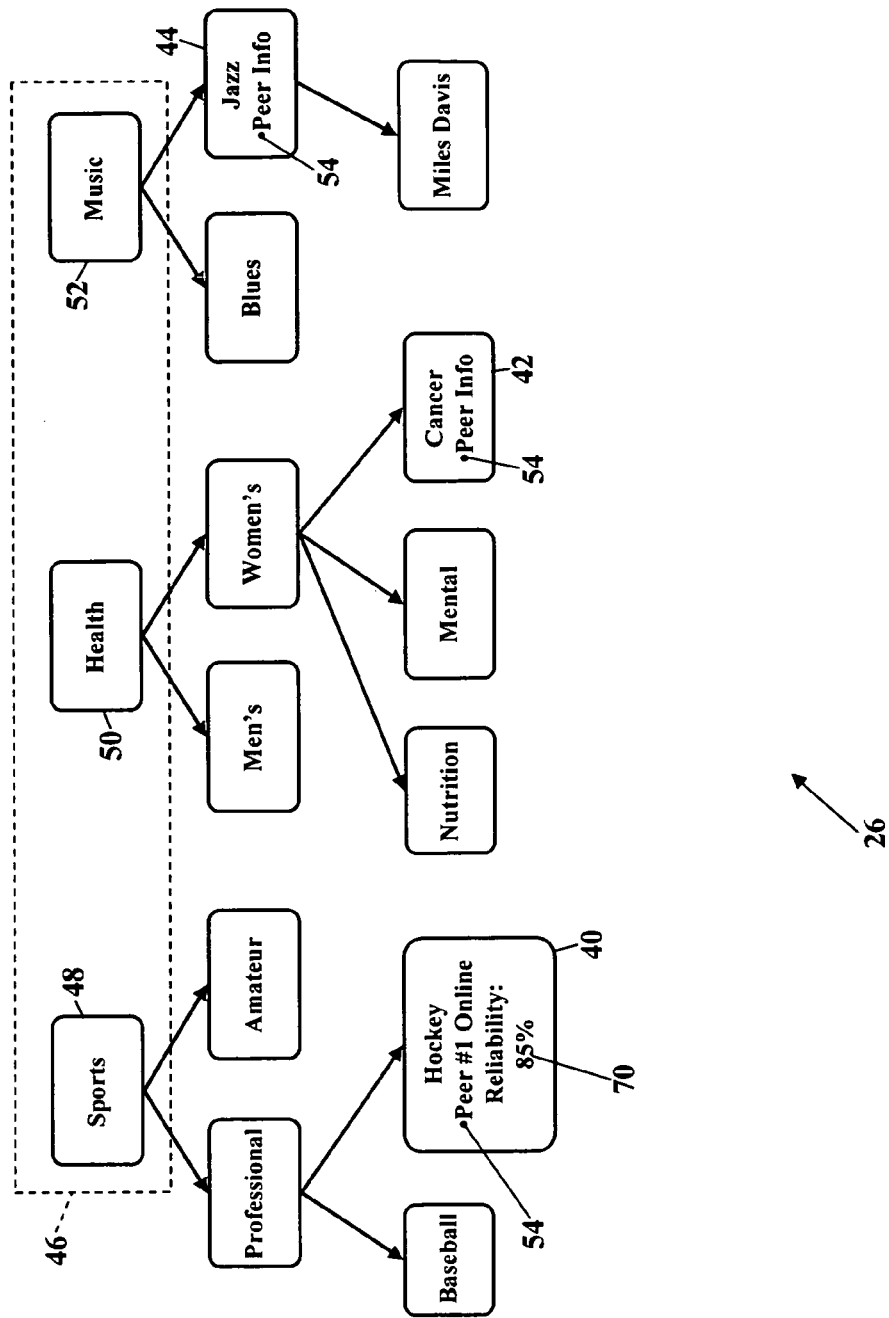

FIG. 8 is another schematic that further illustrates the peer information 54. Here the peer information 54 indicates a reliability 70 of each peer system. Remember, peer-to-peer networks may be unreliable. Because peer systems "come and go," those peer systems that are more frequently online and available may be a more reliable networking connection. When, for example, a particular peer is only online one percent (1%) of the time, that peer is likely an unreliable connection. If data is routed along that unreliable connection, there is a high probability that the data transfer will fail. Users, then, should generally choose an alternative peer that is online ninety percent (90%) of the time. Those peer systems that are more frequently online can be expected to have a higher reliability for communicating information in the peer-to-peer network.

Figure 9:
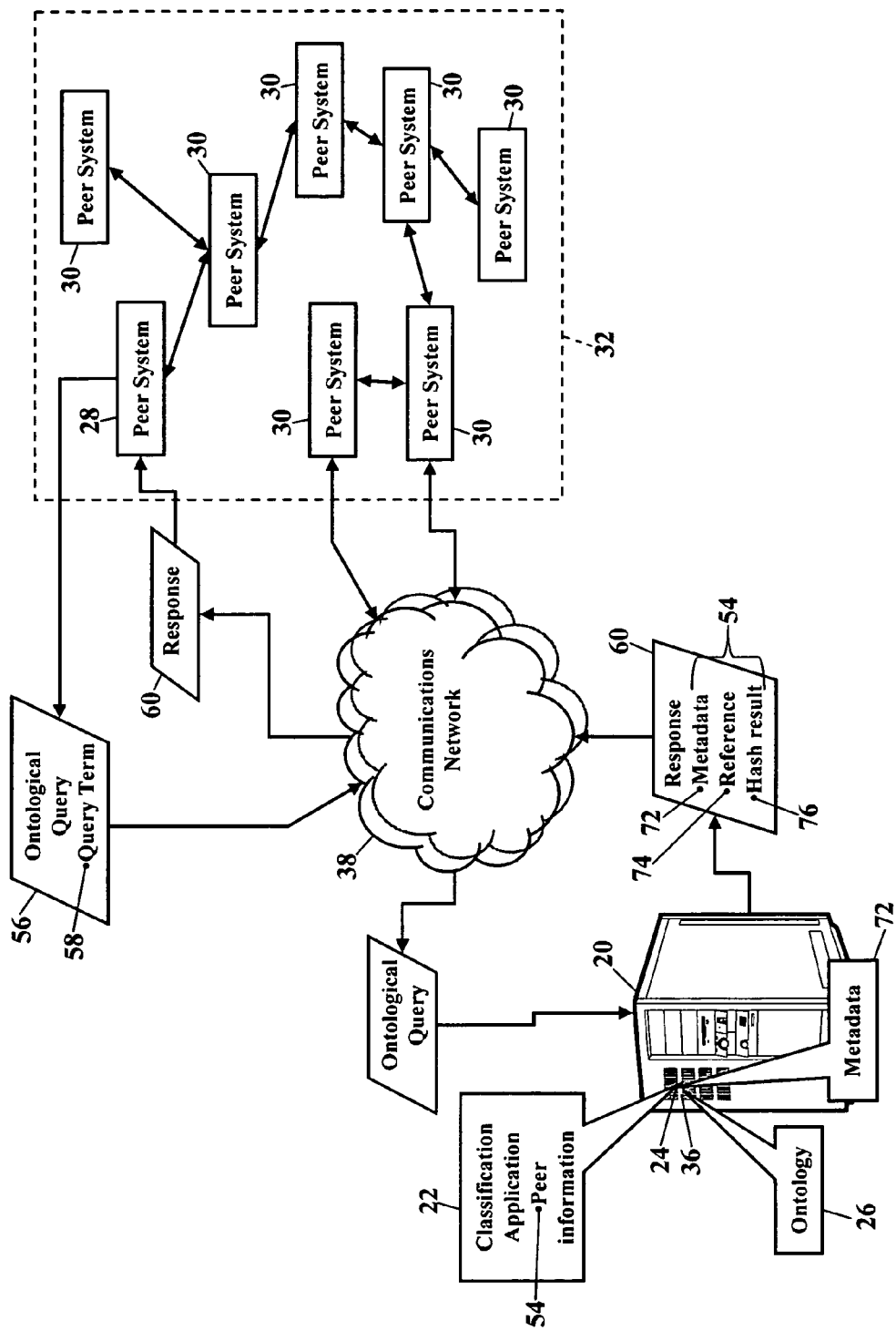
Figure 10:
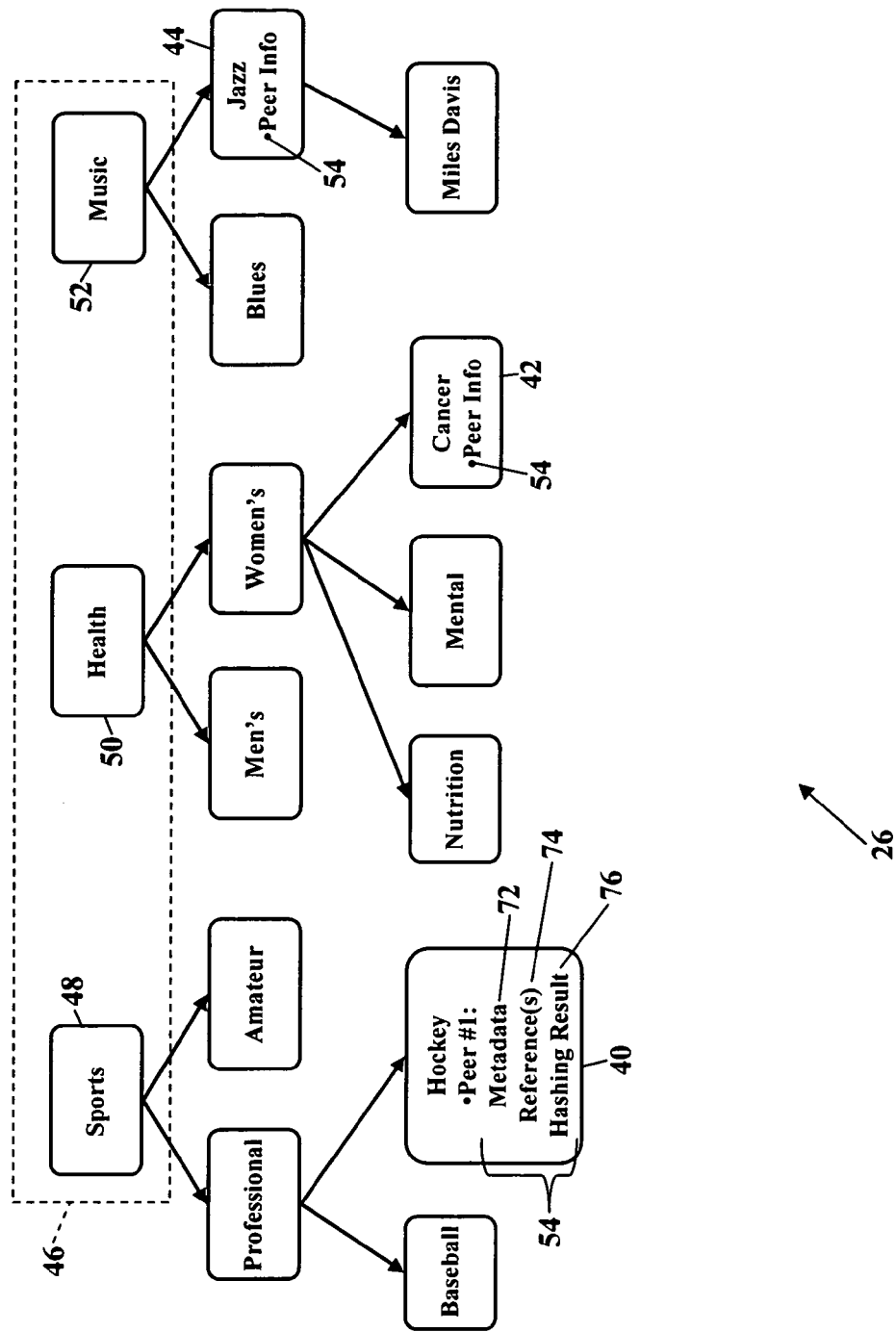

FIGS. 9 and 10 are additional schematics that further illustrate the peer information 54. Here the peer information 54 identifies the information or content available from a peer system. Although multiple peer systems may be classified to the same ontological node, not every peer system contains the same information. For example, even though several peer systems may be clustered around the ontological "Hockey" node 40 (as FIG. 6 illustrated), each peer system likely contains information only generically related to "hockey." One peer system might contain a Gordy Howe biography and statistics, while another peer system might contain a design for a new blocker glove. Even though the information available from both peer systems is generically grouped with the "Hockey" node 44, the actual information available from each peer system is diverse. The peer information 54, then, may partially or entirely identify the actual information stored at each peer system.

The peer information 54 may include metadata 72. As the classification application 22 classifies the peer system 28, the classification application 22 may collect the metadata 72 associated with the peer system 28. When the peer system 28 is then listed as a member of an ontological node, the peer system 28 contains information that satisfies a membership requirement for that node. The classification system 22 may also record the metadata 72 associated with that information. When the peer information 54 is returned with the response 60, the metadata 72 identifies what information is available from the peer system 28. The metadata 72 would then help quickly determine what peer systems contain desired information.

The peer information 54 may additionally or alternatively include references 74 to metadata. The classification application 22 need not provide the actual metadata 72 associated with each peer system. The classification application 22 may find it impractical to collect the metadata 72, or bandwidth constraints may prevent including the metadata 72 in the response 60. The classification application 22 may, instead, only provide the reference 74 that indicates where the metadata 72 may be obtained. The reference 74 may be a link to a website or other server destination where the actual metadata 72 is stored. The reference 74 may additionally or alternatively provide a link to a summary description of a peer system's information. Whatever the reference 74 describes, the reference 74 provides an alternative method of quickly determining what peer systems contain desired information.

The peer information 54 may include other information that identifies content available from a peer system. The peer information 54, for example, may include a message digest that at least partially describes content available from a peer system. The peer information 54 may additionally or alternatively include a hashing result 76. The hashing result 76 may uniquely identifies the content available from a peer system. The hashing result 76 may provide a sufficient analysis of the files available from a peer system. Any hashing algorithm may be used to help identify what content is available from a peer system. For example, an MD5 hashing algorithm is one of many methods for obtaining the hashing result 76.

The peer information 54 may also be used to "weed out" duplicate content hosts. When the classification application 22 classifies peer systems to an ontological node, the classification application 22 may eliminate peers storing duplicate information. Rather than return a list of 1000 peers that store the same content, the classification application 22 may simplify the response 60 by removing duplicate hosting peers.

Figure 11:
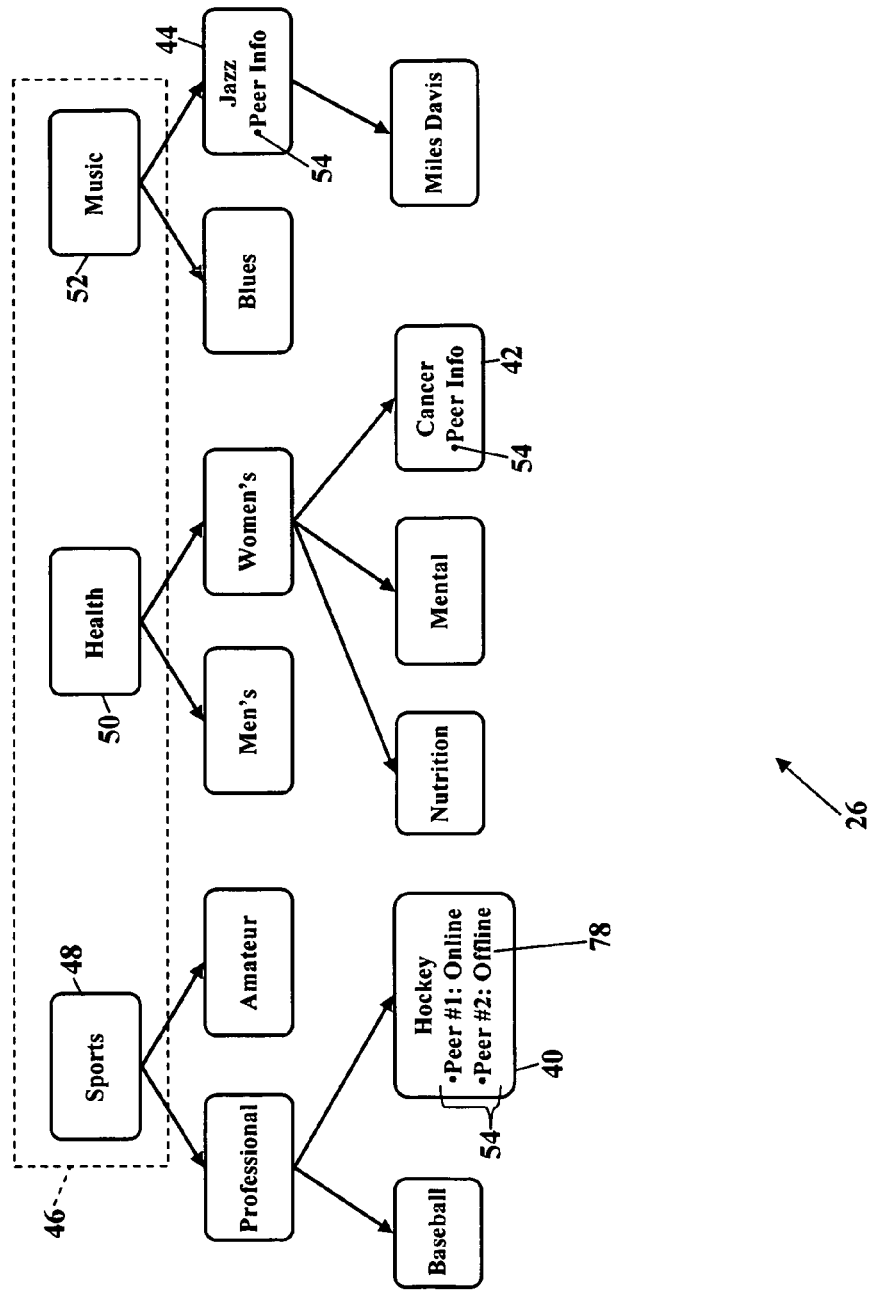

FIG. 11 is yet another schematic that further illustrates the peer information 54. Here the peer information 54 includes an indication 78 of online status. When a peer system is online, then that peer system is presumably available to provide information. Conversely, when a peer system is offline, then information is likely not available from that peer system. So, even if a peer system has exactly the information a user desires, it's inefficient to query an offline peer. The indication 78, then, easily identifies what peer systems are online and available to receive queries for information. The classification application (shown as reference numeral 22 in FIGS. 1-2, 4-5, & 9) may require that every classified peer system provide a notification of online/offline status. The classification application may receive periodic messages from each classified peer system, and these periodic messages indicate online status. The classification application, for example, may require that every ten minutes each classified peer system provide an online status. Any peer system that does not report is assumed offline. The peer information 54, then, may include the indication 78 of online status, thus further providing another method of quickly determining what peer systems contain desired information.

Figure 12:
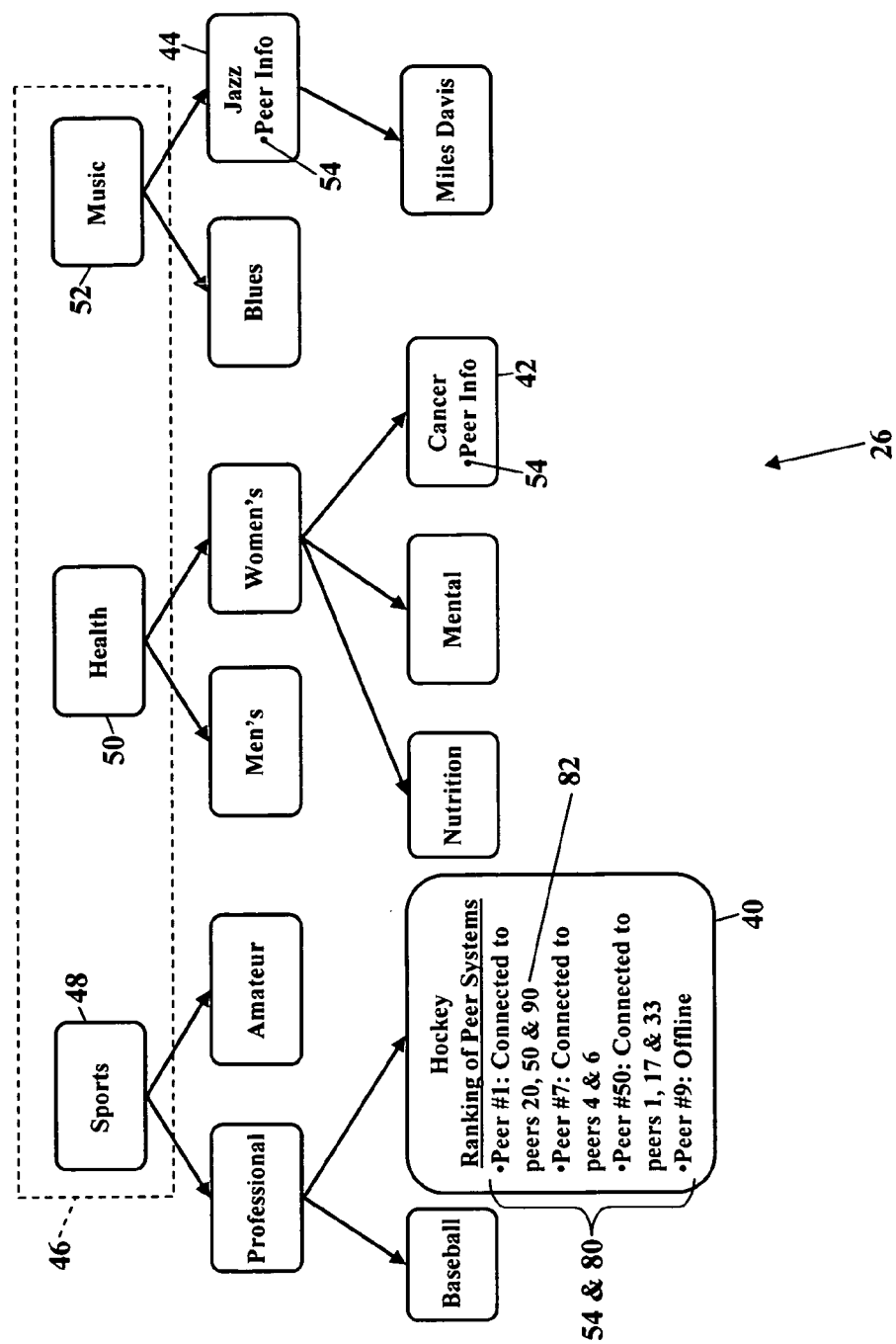

FIG. 12 is another schematic that further illustrates the peer information 54. Here the peer information 54 ranks each peer system. Again, because there may be many peer systems associated with an ontological node, the peer information 54 may include a ranking 80 of peer systems to help identify desired information. Each peer system, as earlier explained, may be scored or ranked to the ontological node. The peer system with the highest score or ranking would presumably have the strongest affinity to the ontological node. A scoring algorithm may be used to determine affinity to an ontological node. Although scoring of peer systems is beyond the scope of this specification, the reader is invited to consult the co-pending and commonly assigned U.S. patent application Ser. No. 11/359,632, filed Feb. 22, 2006, and entitled "Methods, Systems, and Products for Characterizing Target Systems", and incorporated herein by reference in its entirety.

The peer information 54 may also include topology information 82. The peer information 54, for example, may describe peer-to-peer connections. As the peer information 54 may identify the peer systems associated with any node or tier within the ontology 26, the peer information may also identify what peer systems are inter-connected. The peer information 54, as a simple example, may indicate that peer system #1 currently maintains a network connection to peer systems #20, #50, and #90. As each peer system interacts with the classification application (shown as reference numeral 22 in FIGS. 1-2, 4-5, & 9), the classification application may require that each peer system report its instantaneous connections to other peers. Each peer system may additionally or alternatively be required to periodically report those connections. Because the peer information 54 may include instantaneous topological information, this topology information 82 may be used to refine queries. A user, for example, may query the classification application to learn what peer systems contain information on Miles Davis. An additional search term, however, may also specify that the search results must be less than or equal three "hops" from the user's peer system. That is, the user only wants to know about hosting peers that are within three peer-to-peer links from the user's system. Moreover, from the topology information 82 a user may infer that as the number of peer-to-peer links increases, the more time that may be required to send messages or to obtain information. If a hosting peer system is twenty (20) links away, transit times are likely greater than an alternative hosting peer that is within two (2) links. Reliability may also be inferred from the topology information 82. The greater the number of links, then the greater the chances that a communications path may fail. The topology information 82, then, helps determine what peer systems should be selected to download the desired information.

Figure 13:
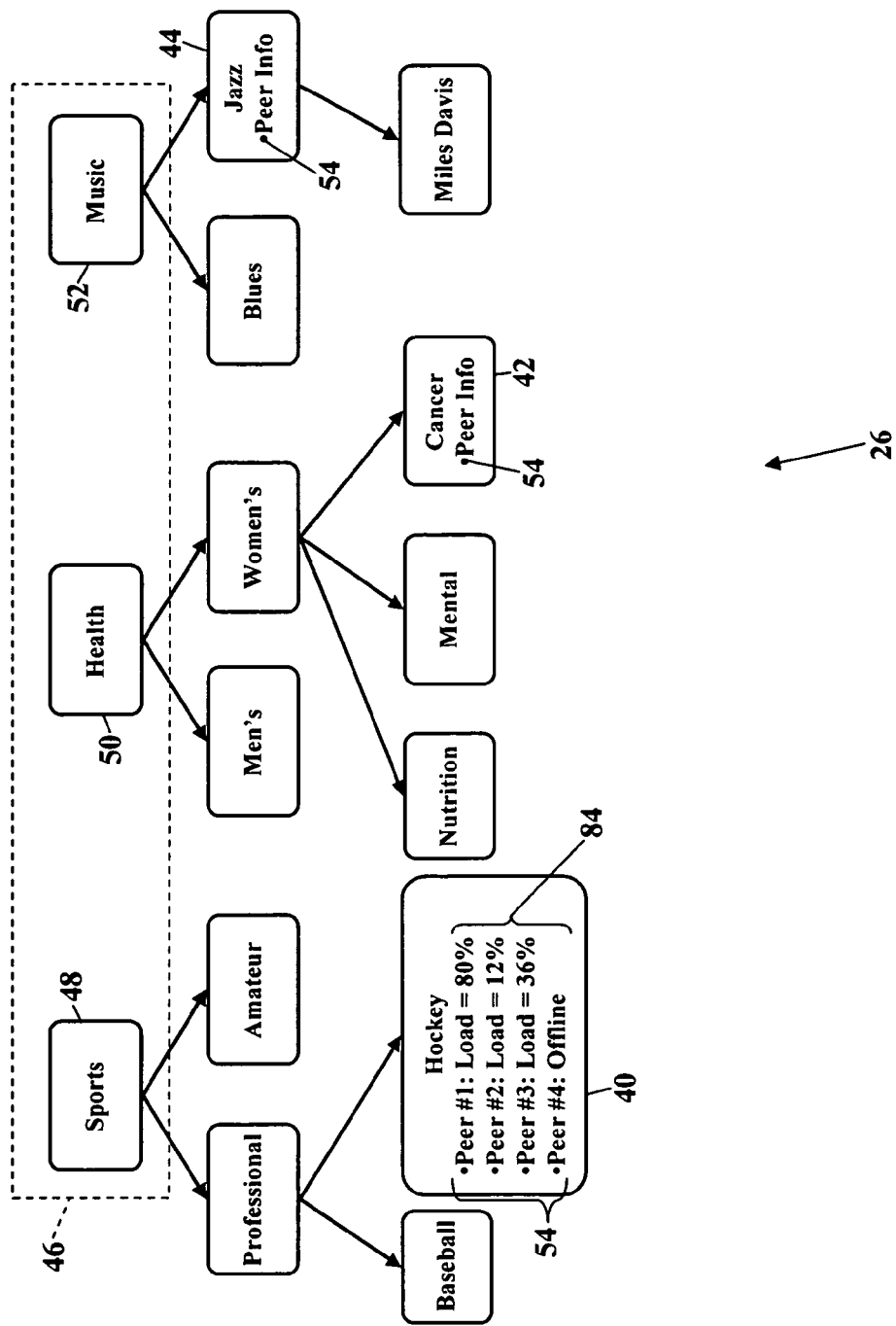

FIG. 13 is yet another schematic that further illustrates the peer information 54. Here the peer information 54 may include loading information 84. The loading information 84 may help determine the most efficient network path. Some host peer systems may be popular and, thus, receive many queries for content. As queries queue at a particular machine, delays begin to develop in that peer connection. Moreover, the delays in that same peer connection may propagate within the network and, thus, cause other peer-to-peer connections to experience delays or congestion. The loading information 84, however, allows users to select alternative hosting peers or routing paths with less congestion or delay. The least delay may permit the most efficient data sharing.

The exemplary embodiments also permit "swarming" around ontological concepts. The above paragraphs explain how peer systems may be classified to an ontological node. Those peer systems that are classified to the same ontological node may thus have similar subject matter interests. Those similarly classified peer systems may thus aggregate, or "swarm," around an ontological concept. The swarming peer systems may thus be queried for information related to the ontological node. Queries need not be "flooded" to an entire peer-to-peer network to discover relevant and useful information. The peer systems may thus form a "virtual peer" that may be accessed by other peers that are not members of the swarm. The virtual peer may also be queried via out-of-band messages, such as by an HTTP request. This HTTP request, or "swarm query," may be addressed to the swarm and communicate via the central server 20. The central server 20 may then examine any metadata associated with the swarm and return a query result. When the central server 20 receives the swarm query, the classification application 22 may examine cached metadata, or the classification application 22 may retrieve remotely stored metadata. The peer systems forming the swarm, however, need not be (but could be) involved in the swarm query.

A peer member of the swarm may know the content available from the swarm. Swarm members may share metadata, or references to the metadata, so that swarm members know the identify of each other's content. A web browser operating in a swarm peer system may process the metadata, or the reference, or other peer information associated with peers or content (the metadata, the reference, and the peer information are shown, respectfully, as reference numerals 72, 74, and 54 in FIG. 10). Moreover, the classification application may eliminate duplicate content listings (as above explained) to simplify content available from the swarm. The swarming peer systems may also provide the load information 84, such that the swarm peer with the lightest load receives query requests.

The exemplary embodiments also include a swarm web portal. If the classification application 22 and/or the ontology 26 operate in the central server 20, the central server 20 may provide access to the swarm via an HTTP request. That is, central server 20 may provide access to the swarm outside of the peer-to-peer networking environment. Anyone could send an HTTP request, and the central server 20 would forward or direct that HTTP request to the swarm. Any communications device, from any location or networking environment, may query the swarm for content. The swarm may thus be queried from outside the peer-to-peer environment. The central server 20 may thus provide web portal functionality for the swarm, and this web portal may allow a web page user to query, to browse, and to download content from the swarming peer systems.

Third parties may also add content using ontological concepts. A third party (such as a third party content provider) may add content that is associated with an ontological node. This third party content may include advertisements, movies, pictures, games, ringtones, and other sample content that may be offered or presented to web portal visitors. The third party content may also include products or services that are associated with the nodal ontological concept. The third party content provider establishes their content on the node and makes it available to anyone. The third party would, hope, of course, that a user will pay a fee for downloading the content, rather than risking a download from an unknown peer. Some users may rather pay a trusted entity or corporation for a safer and more reliable data transfer than obtain a free download from an unknown device. AMAZON® or EBAY® may successfully charge $9.95 for information that is freely available from an unknown peer system. This third party content, then, may or may not be stored on a peer system within the swarm. The third party may simply want post a notice or advertisement describing a product or service and an HTTP link to that product or service.

Figure 14:
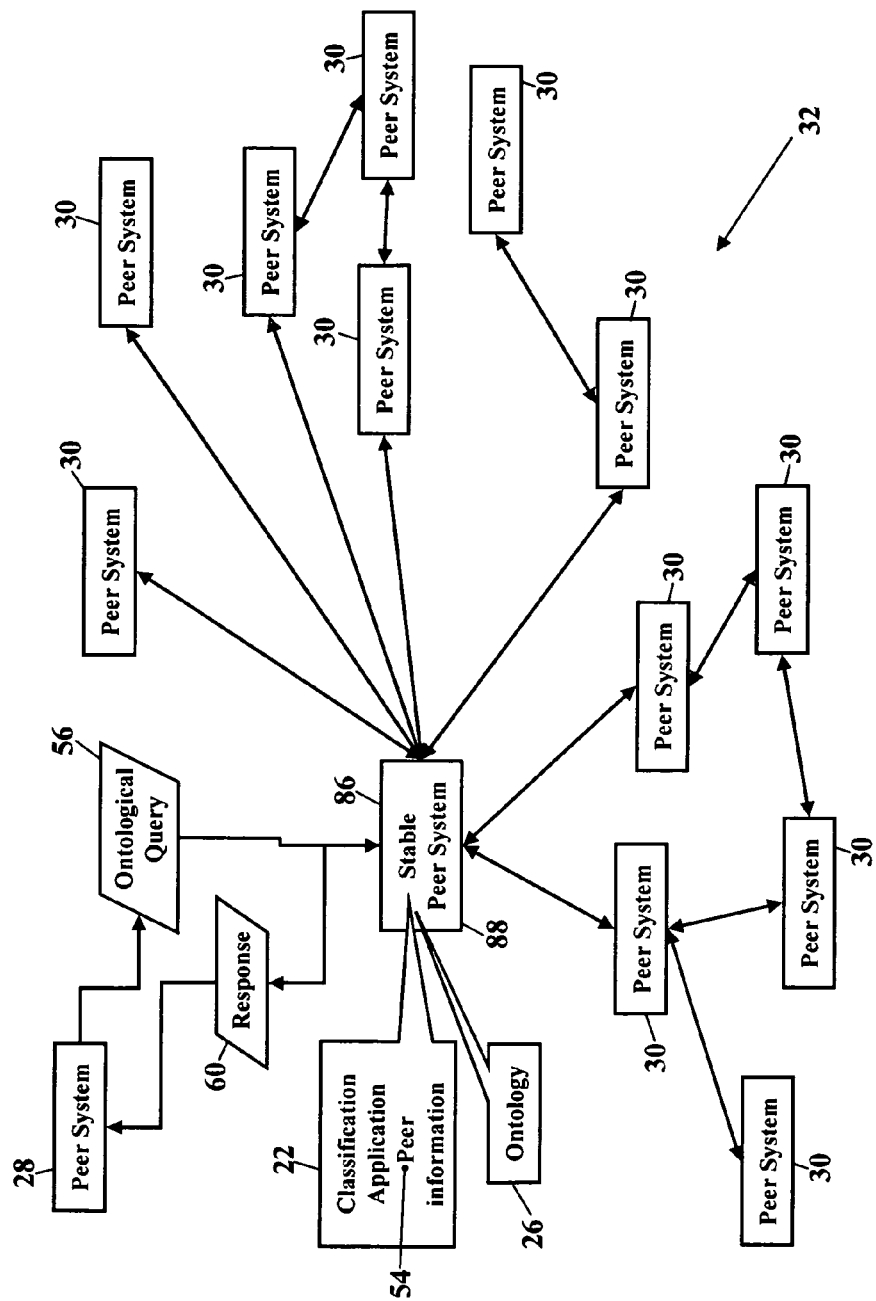
FIG. 14 is a schematic illustrating an alternative operating environment.

FIG. 14 is a schematic illustrating an alternative network operating environment. Here the classification application 22 operates in a stable peer system 86. That is, the classification application 22 operates as a hosting peer 88 within the peer-to-peer network 32. The hosting peer 88 is preferably a stable computer or other communications device that is always, or nearly always, online and available for queries. The hosting peer 88 may also be a cluster of peers which share the functions of the classification application 22. As each peer system 30 comes online, the hosting peer 88 should be available to receive classification requests. Otherwise, the peer-to-peer network 32 remains unorganized and information is difficult to find.

Figure 15:
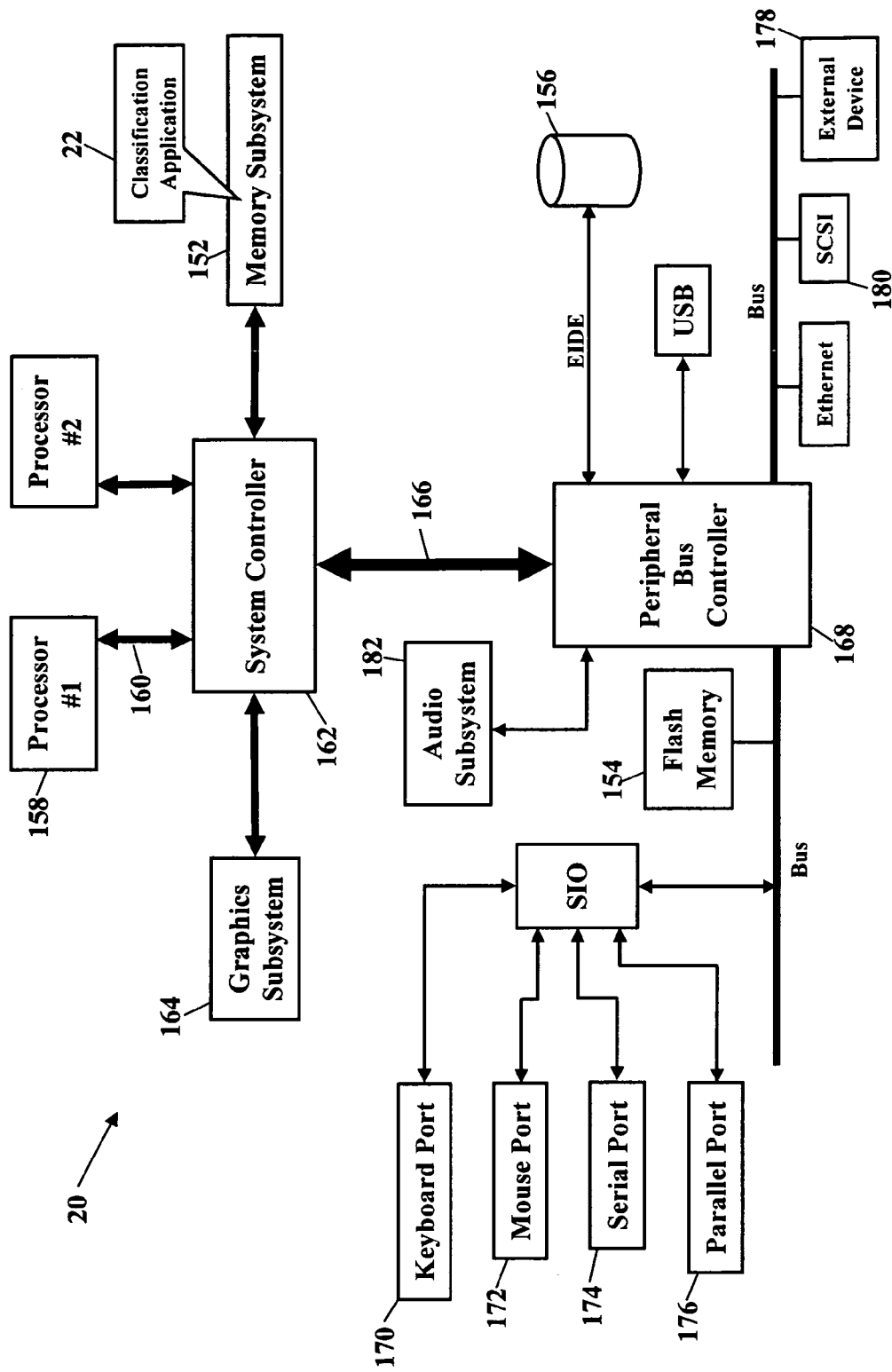
FIG. 15 depicts another possible operating environment.

FIG. 15 depicts another possible operating environment. FIG. 15 is a block diagram showing the classification application 22 residing in the central server 20. FIG. 15, however, may also represent a block diagram of the peer systems (shown as reference numerals 28 and 30 in FIGS. 1-2, 4-5, 9, & 14) or the "super" hosting peer (shown as reference numerals 86 and 88 in FIG. 14). FIG. 15 may also represent a block diagram of any computer, communications device, or processor-controlled device in which the classification application 22 (and/or the ontology 26) may store or operate. The classification application 22 operates within a system memory device. The classification application 22, for example, is shown residing in a memory subsystem 152. The classification application 22, however, could also reside in flash memory 154 or peripheral storage device 156. The computer system 24 also has one or more central processors 158 executing an operating system. The operating system, as is well known, has a set of instructions that control the internal functions of the computer system 24. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and external hard drive ports 180 (such as IDE, ATA, SATA, or SCSI). The Peripheral Bus Controller 168 could also include an audio subsystem 182. Those of ordinary skill in the art understand that the program, processes, methods, and systems described herein are not limited to any particular computer system or computer hardware.

One example of the central processor 158 is a microprocessor. Advanced Micro Devices, Inc., for example, manufactures a full line of ATHLON® microprocessors (ATHLON® is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

Any operating system may be used. Any of the WINDOWS® operating systems, for example, may be suitable (WINDOWS® is a registered trademark of Microsoft Corporation, One Microsoft Way, Redmond Wash. 98052-6399, 425.882.8080, www.Microsoft.com). Other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical User Interface (GUI). The Graphical User Interface typically includes a combination of signals communicated along the keyboard port 170 and the mouse port 172. The Graphical User Interface provides a convenient visual and/or audible interface with a user of the computer system 24.

Figure 16:
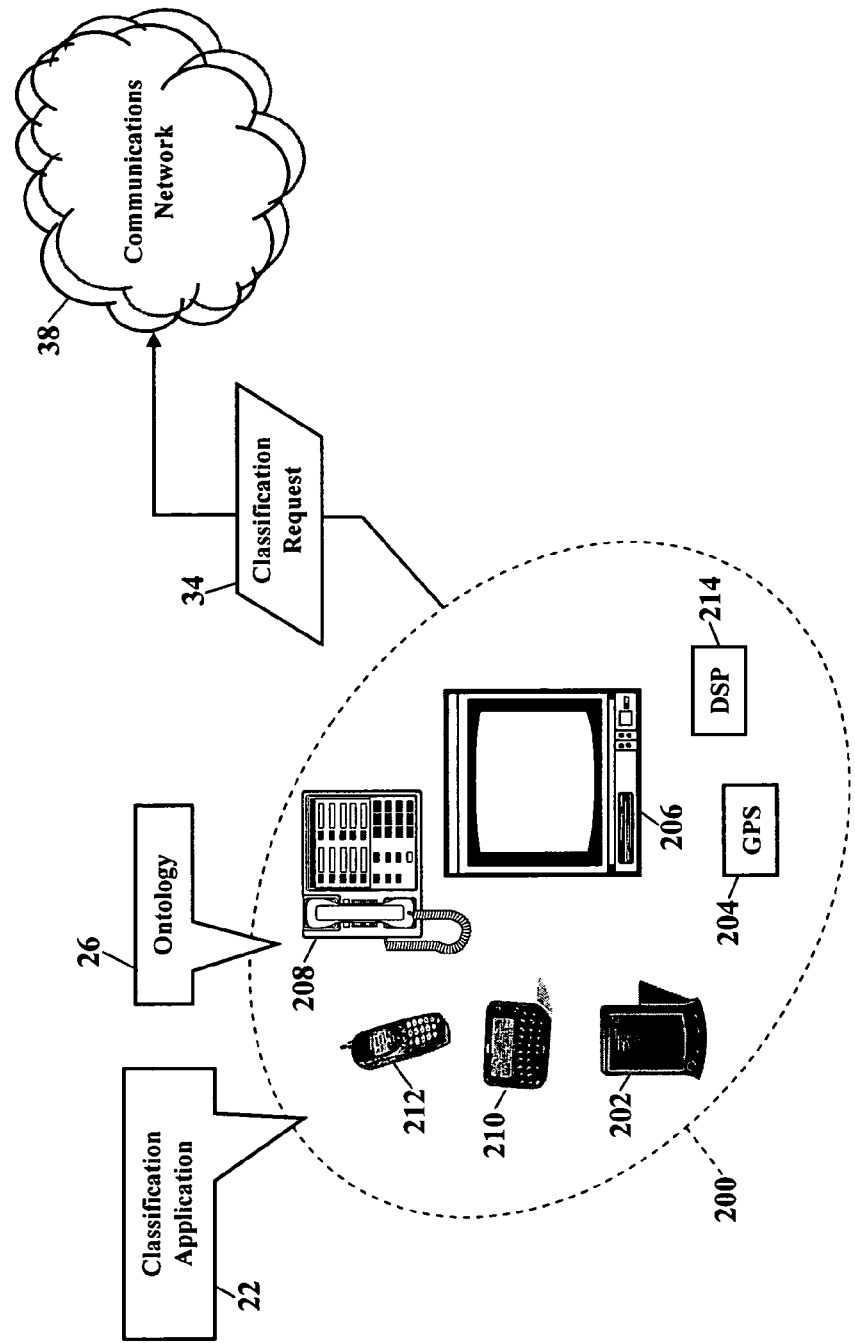
FIG. 16 is a schematic further illustrating various communications devices in which a classification application and/or an ontology may operate.

FIG. 16 is a schematic further illustrating various communications devices 200 in which the classification application 22 and/or the ontology 26 may operate. Here the classification application 22 and/or the ontology 26 may entirely or partially operate within a personal digital assistant (PDA) 202, a Global Positioning System (GPS) device 204, an interactive television 206, an Internet Protocol (IP) phone 208, a pager 210, a cellular/satellite phone 212, or any computer system and/or communications device utilizing a digital signal processor (DSP) 214. The communications device 200 may also include watches, radios, vehicle electronics, clocks, printers, gateways, and other apparatuses and systems.

Moreover, the present invention may be applied regardless of networking environment. The communications network 38 may be a cable network operating in the radio-frequency domain and/or the Internet Protocol (IP) domain. The communications network 38, however, may also include a distributed computing network, such as the Internet (sometimes alternatively known as the "World Wide Web"), an intranet, a local-area network (LAN), and/or a wide-area network (WAN). The communications network 38 may include coaxial cables, copper wires, fiber optic lines, and/or hybrid-coaxial lines. The communications network 38 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

The classification application 22 and/or the ontology 26 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the classification application 22 and/or the ontology 26 to be easily disseminated. A computer program product comprises the classification application 22 and/or the ontology 26 stored on the computer-readable medium. The classification application 22 and/or the ontology 26 comprises computer-readable instructions/code for classifying peer systems, as hereinabove explained.

While the present invention has been described with respect to various aspects, features, principles, and exemplary embodiments, those skilled and unskilled in the art will recognize the present invention is not so limited. Other aspects, variations, modifications, and alternative embodiments may be made without departing from the spirit and scope of the present invention and are considered within the scope of the concepts disclosed herein and the invention as described by the claims.

What is claimed is:

1. A method comprising:
   providing an ontology that represents a hierarchical organization of a plurality of nodes, wherein each node of the plurality of nodes corresponds to one class of a plurality of classes;
   associating each peer system of a plurality of peer systems with at least one of the plurality of nodes in the ontology based on information maintained on each peer system and a class of the plurality of classes to which the information corresponds;
   receiving a request including a select class of the plurality of classes from a first peer system of the plurality of peer systems;
   identifying a select node of the plurality of nodes based on the select class;
   identifying at least one peer system of the plurality of peer systems that is associated with the select node; and
   sending to the first peer system identification information identifying the at least one peer system and identifying a date and a time of when the at least one peer system was associated with the ontology.

2. A method according to claim 1, wherein the step of sending to the first peer system the identification information identifying the at least one peer system comprises sending an identification of content available from the at least one peer system.

3. A method according to claim 1, further comprising ranking each peer system associated with each node in the ontology.

4. A system comprising:
   a classification application stored in memory; and
   a processor communicating with the memory, the processor adapted to:
   providing an ontology that represents a hierarchical organization of a plurality of nodes, wherein each node of the plurality of nodes corresponds to one class of a plurality of classes;

associate each peer system of a plurality of peer systems with at least one of the plurality of nodes in the ontology based on information maintained on each peer system and a class of the plurality of classes to which the information corresponds;

receive a request including a select class of the plurality of classes from a first peer system of the plurality of peer systems;

identify a select node of the plurality of nodes based on the select class;

identify at least one peer system of the plurality of peer systems that is associated with the select node; and send to the first peer system identification information identifying the at least one peer system and identifying a date and a time of when the at least one peer system was associated with the ontology.

5. A system according to claim 4, wherein the processor is further adapted to send an identification of content available from the at least one peer system.

6. A system according to claim 4, wherein the processor is further adapted to rank each peer system associated with each node in the ontology.

7. A computer program product comprising a computer-readable medium storing instructions for performing the steps:

providing an ontology that represents a hierarchical organization of a plurality of nodes, wherein each node of the plurality of nodes corresponds to one class of a plurality of classes;

associate each peer system of a plurality of peer systems with at least one of the plurality of nodes in the ontology based on information maintained on each peer system and a class of the plurality of classes to which the information corresponds;

receive a request including a select class of the plurality of classes from a first peer system of the plurality of peer systems;

identify a select node of the plurality of nodes based on the select class;

identify at least one peer system of the plurality of peer systems that is associated with the select node; and send to the first peer system identification information identifying the at least one peer system and identifying a date and a time of when the at least one peer system was associated with the ontology.

8. A computer program product according to claim 7, further comprising instructions for sending an identification of content available from the at least one peer system.

9. A computer program product according to claim 7, further comprising instructions for ranking each peer system associated with each node in the ontology.

* * * * *